United States Patent
Kragten et al.

(10) Patent No.: US 9,266,115 B2
(45) Date of Patent: Feb. 23, 2016

(54) POWDER FORMED FROM MINERAL OR ROCK MATERIAL WITH CONTROLLED PARTICLE SIZE DISTRIBUTION FOR THERMAL FILMS

(71) Applicant: UNIMIN CORPORATION, New Canaan, CT (US)

(72) Inventors: David D Kragten, Burnsville, NC (US); Christy Karr, Imperial, PA (US); Scott Van Remortel, Bakersville, NC (US); Robert Ratcliff, Bakersville, NC (US); Ibezim Anazia, Burnsville, NC (US); Louis M. Schlesinger, Spruce Pine, NC (US)

(73) Assignee: UNIMIN CORPORATION, New Canaan, CT (US)

( * ) Notice: Subject to any disclaimer, the term of this patent is extended or adjusted under 35 U.S.C. 154(b) by 0 days.

(21) Appl. No.: 14/313,397

(22) Filed: Jun. 24, 2014

(65) Prior Publication Data

US 2014/0306038 A1    Oct. 16, 2014

Related U.S. Application Data

(60) Division of application No. 13/420,757, filed on Mar. 15, 2012, now Pat. No. 8,795,427, which is a continuation of application No. 12/237,628, filed on Sep. 25, 2008, now Pat. No. 8,182,601.

(60) Provisional application No. 61/124,498, filed on Apr. 17, 2008.

(51) Int. Cl.
*C09C 1/42*    (2006.01)
*C09C 1/28*    (2006.01)
(Continued)

(52) U.S. Cl.
CPC ............. *B02C 23/30* (2013.01); *C09D 5/031* (2013.01); *Y10T 428/2982* (2015.01)

(58) Field of Classification Search
CPC ............. C09C 1/36; C09C 1/28; C09C 1/42; C09C 1/64; C09C 1/02
See application file for complete search history.

(56) References Cited

U.S. PATENT DOCUMENTS 2,261,884 A    11/1941    Koenig
2,262,951 A    11/1941    Lyle
(Continued)

FOREIGN PATENT DOCUMENTS

GB    1297622    11/1972
JP    63 158246    7/1988
(Continued)

OTHER PUBLICATIONS

International Search Report and Written Opinion for PCT/US08/77657, filed Sep. 25, 2008.
(Continued)

*Primary Examiner* — Pegah Parvini
(74) *Attorney, Agent, or Firm* — Rankin, Hill & Clark LLP

(57) ABSTRACT

An ultra-fine powder formed from a naturally occurring mineral or rock material and having a controlled or "engineered" particle size distribution (PSD) to match the infrared spectra with a maximum particle size in the range of 14-17 microns measured as either D99, or preferably D95, and a minimum particle size D5 in the range of 4-7 microns. Preferably the maximum particle size is about 15 microns, the minimum particle size is about 5 microns and the D50 particle size is about 8-10 microns with the moisture content of the particle size "engineered" powder being less than about 0.20 percent by weight and preferably about 0.05 to 0.08 percent by weight of the powder. This specially "engineered" ultra-fine powder is used to reduce the thermicity of thermal film to a value less than about 20%.

11 Claims, 23 Drawing Sheets

| TARGET SIZE | D99.9 | D99 | D95 | D90 | D75 | D50 | D25 | D10 | D5 | D1 |
|---|---|---|---|---|---|---|---|---|---|---|
| 4X15 (9) | 17.1 | 15.7 | 14.2 | 13.2 | 11.2 | 8.82 | 6.99 | 5.78 | 5.16 | 2.33 |
| 5X15 (10) | 17.1 | 16.1 | 14.6 | 13.7 | 11.7 | 9.41 | 7.46 | 6.20 | 5.57 | 4.68 |
| 6X15 (11) | 18.6 | 17.9 | 15.1 | 14.8 | 12.4 | 10.1 | 8.02 | 6.46 | 5.72 | 4.47 |

(51) Int. Cl.
  *C09C 1/02* (2006.01)
  *B02C 23/30* (2006.01)
  *C09D 5/03* (2006.01)

(56) References Cited

U.S. PATENT DOCUMENTS

| | | | |
|---|---|---|---|
| 2,269,912 A | 1/1942 | Ladoo |
| 2,478,645 A | 8/1949 | Thiess |
| 2,765,074 A | 10/1956 | Diamond |
| 2,871,132 A | 1/1959 | Hummel |
| 3,044,619 A | 7/1962 | Knolle |
| 3,079,309 A | 2/1963 | Wainer |
| 3,326,701 A | 6/1967 | Von Freyhold |
| 3,389,002 A | 6/1968 | Huffcut |
| 3,486,706 A | 12/1969 | Weyand |
| 3,721,066 A | 3/1973 | Teller |
| 3,917,489 A | 11/1975 | Waters, Jr. |
| 3,995,005 A | 11/1976 | Teller |
| 3,998,624 A | 12/1976 | Harris et al. |
| 4,028,289 A | 6/1977 | Brown |
| 4,036,505 A | 7/1977 | Floyd et al. |
| 4,130,423 A | 12/1978 | Chastant et al. |
| 4,183,760 A | 1/1980 | Funk et al. |
| 4,242,251 A | 12/1980 | Aishima |
| 4,319,890 A | 3/1982 | Teller et al. |
| 4,396,431 A | 8/1983 | Seeney et al. |
| 4,468,473 A | 8/1984 | Drolet et al. |
| 4,551,241 A | 11/1985 | Saverse et al. |
| 4,639,576 A | 1/1987 | Shoemaker et al. |
| 4,640,797 A | 2/1987 | Goguen |
| 4,663,226 A | 5/1987 | Vajs et al. |
| 4,743,625 A | 5/1988 | Vajs et al. |
| 4,781,671 A | 11/1988 | Pober et al. |
| 4,850,541 A | 7/1989 | Hagy |
| 4,869,786 A | 9/1989 | Hanke |
| 4,883,714 A | 11/1989 | Stockl et al. |
| 4,885,832 A | 12/1989 | English |
| 4,979,686 A | 12/1990 | Szegvari et al. |
| 5,066,330 A | 11/1991 | Holcombe, Jr. et al. |
| 5,080,293 A | 1/1992 | Szegvari et al. |
| 5,153,155 A | 10/1992 | Kohut |
| 5,199,656 A | 4/1993 | Szegvari et al. |
| 5,236,499 A | 8/1993 | Chervenak et al. |
| 5,380,356 A | 1/1995 | Gundlach et al. |
| 5,423,490 A | 6/1995 | Zampini |
| 5,530,057 A | 6/1996 | Humphrey et al. |
| 5,686,507 A | 11/1997 | Hermele et al. |
| 5,709,909 A | 1/1998 | Leibfarth et al. |
| 5,866,646 A | 2/1999 | Radosta |
| 5,883,029 A | 3/1999 | Castle |
| 5,961,943 A | 10/1999 | Komatsu et al. |
| 6,074,474 A | 6/2000 | Broome et al. |
| 6,468,336 B1 | 10/2002 | Fiedler et al. |
| 6,543,710 B2 | 4/2003 | Konetzka et al. |
| 6,569,923 B1 | 5/2003 | Slagter |
| 6,596,837 B2 | 7/2003 | Hogge et al. |
| 6,739,456 B2 | 5/2004 | Svoronos et al. |
| 6,790,904 B2 | 9/2004 | White et al. |
| 6,793,875 B1 | 9/2004 | Shaw et al. |
| 6,905,634 B2 | 6/2005 | Burnell-Jones |
| 7,008,513 B2 | 3/2006 | Davenport et al. |
| 7,757,976 B2 | 7/2010 | Schlesinger et al. |
| 2001/0050357 A1 | 12/2001 | Krohn |
| 2002/0013401 A1 | 1/2002 | Friel et al. |
| 2002/0137872 A1 | 9/2002 | Schneider et al. |
| 2002/0173597 A1 | 11/2002 | Zarnoch et al. |
| 2003/0056696 A1 | 3/2003 | Fenske et al. |
| 2003/0085383 A1 | 5/2003 | Burnell-Jones |
| 2003/0085384 A1 | 5/2003 | Burnell-Jones |
| 2003/0215770 A1 | 11/2003 | Sekino et al. |
| 2003/0224174 A1 | 12/2003 | White et al. |
| 2003/0229157 A1 | 12/2003 | Schneider et al. |
| 2004/0068048 A1 | 4/2004 | Giles et al. |
| 2004/0087433 A1 | 5/2004 | Herold |
| 2004/0175407 A1 | 9/2004 | McDaniel |
| 2005/0019574 A1 | 1/2005 | McCrary |
| 2005/0059765 A1 | 3/2005 | Finch et al. |
| 2005/0167534 A1 | 8/2005 | Tomikawa et al. |
| 2005/0214534 A1 | 9/2005 | Adamo et al. |
| 2006/0068314 A1 | 3/2006 | Kawata |
| 2006/0075930 A1 | 4/2006 | Wang et al. |
| 2006/0078748 A1 | 4/2006 | Ambrose et al. |
| 2006/0081371 A1 | 4/2006 | Duenckel et al. |
| 2006/0140878 A1 | 6/2006 | Cornelius et al. |
| 2006/0160930 A1 | 7/2006 | Schneider |
| 2006/0234026 A1 | 10/2006 | Huusken |
| 2006/0235113 A1 | 10/2006 | Dorgan et al. |
| 2007/0221097 A1 | 9/2007 | Tarng et al. |
| 2008/0011190 A1 | 1/2008 | Van Remortel et al. |
| 2008/0040980 A1 | 2/2008 | Janik et al. |
| 2008/0185463 A1* | 8/2008 | Schlesinger et al. ............ 241/19 |
| 2009/0013905 A1 | 1/2009 | VanRemortel et al. |
| 2009/0117382 A1* | 5/2009 | Janik et al. .................... 428/402 |

FOREIGN PATENT DOCUMENTS

| | | |
|---|---|---|
| WO | 03/102088 A1 | 12/2003 |
| WO | 2007/123674 | 11/2007 |
| WO | WO 2008/008413 | 1/2008 |

OTHER PUBLICATIONS

Unimin Corporation, Minex Functional Fillers and Extenders Technical Data, May 2001; pp. 1-2.
Ibrahim et al,; "Dry Magnetic Separation of Nepheline Syenite Ores"; Physiochemical Problems of Mineral Processing, 38 (2002); pp. 173-183.
Koenig, C.J.; Some Fundamental Properties of Nepheline Syenite; pp. 35-38.
Minbloc, Physical and Chemical Properties Information Brochure, Oct. 2001.
Minbloc, Antiblocking Additives, Information Brochure, 2001.
Minbloc, Antiblocking Additives, Technical Data, Jun. 1988.
Bath, Frank; "Consistent Milling on a Nano Scale," Ceramic Industry, Feb. 2005.
"Nepheline Syenite" from Wikipedia, Sep. 2006.

* cited by examiner

| TARGET SIZE | D99.9 | D99 | D95 | D90 | D75 | D50 | D25 | D10 | D5 | D1 |
|---|---|---|---|---|---|---|---|---|---|---|
| 4X15 (9) | 17.1 | 15.7 | 14.2 | 13.2 | 11.2 | 8.82 | 6.99 | 5.78 | 5.16 | 2.33 |
| 5X15 (10) | 17.1 | 16.1 | 14.6 | 13.7 | 11.7 | 9.41 | 7.46 | 6.20 | 5.57 | 4.68 |
| 6X15 (11) | 18.6 | 17.9 | 15.1 | 14.8 | 12.4 | 10.1 | 8.02 | 6.46 | 5.72 | 4.47 |

FIG. 7

| FILLER | D50 (MICRONS) | THERMICITY (%) |
|---|---|---|
| MINBLOC HC1400 | 7.6 | 21.2 |
| MINBLOC HC1400 | 7.6 | 20.2 |
| MINBLOC HC1400 | 7.6 | 20.8 |
| NS 6.0 X 16.5 | 10.1 | 19.0 |
| NS 6.0 X 16.5 | 10.1 | 18.8 |
| NS 4.9 X 15.2 | 8.7 | 19.0 |
| NS 5.1 X 15.6 | 9.3 | 19.5 |

MODEL 400 AFG JET MILL RUN

| MILL TYPE | 400 AFG |
|---|---|
| CLASSIFIER TYPE | STANDARD STEEL |
| CLASSIFIER RPM | 4,250 |
| CLASSIFIER AMPS EMPTY | 4 |
| CLASSIFIER AMPS FULL | 9-10 |
| NOZZLE TYPE | LAVALLE |
| NOZZLE SIZE (mm) | 14 |
| STEM SIZE (mm) | 14 |
| GRIND AIR PRESSURE (PSI) | 32 |
| GRIND AIR FLOW (CFM) | 610 |
| SYSTEM AIR FLOW (CFM) | 620 |
| MILL PRESSURE ("WC) | -3 |
| BED LEVEL (BEFORE/AFTER) | EVEN/EVEN |
| BED WEIGHT (BEFORE/DURING/AFTER) | 66/60/66 |
| FEEDER TYPE | K-TRON |
| FEEDER OUTPUT (%) | 19% |
| TIME (MIN.) | 49 |
| PRODUCT (LBS.) | 198 |
| CAPACITY (LBS./HR.) | 242 |
| $d4$ (μm) | 2.24 |
| $d50$ (μm) | 5.53 |
| $d96$ (μm) | 11.69 |
| % < 5 μm | 42.9% |
| % < 15 μm | 99.8% |

MODEL 200 ATP AIR CLASSIFIER (AC) WITH JET MILLED PRODUCT

| MILL TYPE | 200 ATP |
|---|---|
| MATERIAL | JM PRODUCT |
| CLASSIFIER TYPE | STANDARD STEEL |
| CLASSIFIER RPM | 4,500 |
| INSERT | YES |
| CLASSIFIER AMPS (IDLE) | 4 |
| CLASSIFIER AMPS (LOAD) | 4–5 |
| GS AIRFLOW (CFM) | 500 |
| FEED INLET AIRFLOW (CFM) | 200 |
| TOTAL AIRFLOW (CFM) | 700 |
| BLOWER AMPS (IDLE/LOAD) | 39/39 |
| CLASSIFIER ΔP (IN. WG) | 50/50 |
| FEEDER TYPE | K-TRON |
| FEEDER SETTING | 320 HIGH |
| TIME (MIN.) | 39.53 |
| FEED AMOUNT (LBS.) | 143 |
| FEED RATE (LB./HR.) | 217 |
| PRODUCT FINES (LBS.) | 94.0 |
| PRODUCT COARSE (LBS.) | 42.0 |
| FINES YIELD (%) | 71% |
| COARSE YIELD (%) | 29% |
| SAMPLE | COARSE |
| d4 (μm) | 5.75 |
| d50 (μm) | 8.71 |
| d96 (μm) | 13.37 |
| % < 5 μm | 0.5% |
| % < 15 μm | 98.7% |

FIG. 26

5X15 POWDER SPECIFICATION

| PARAMETER | MIN | MAX |
|---|---|---|
| PARTICLE SIZE ANALYSIS, % > 15 MICRONS (COULTER LS13-320) | – | 4 |
| PARTICLE SIZE ANALYSIS, % > 20 MICRONS (COULTER LS13-320) | – | 0 |
| PARTICLE SIZE ANALYSIS, % < 5 MICRONS (COULTER LS13-320) | – | 4 |
| PARTICLE SIZE ANALYSIS, MEDIAN SIZE, MICRONS (COULTER LS13-320) | 9 | 11 |
| OIL ABSORPTION, % (ASTM D-281) | 25 | 35 |
| DRY BRIGHTNESS, % (TAPPI T552) | 83 | – |
| MOISTURE, % (CLP-19A) | – | 0.30 |
| pH VALUE | 9.0 | 11.0 |

FIG. 27

POWDER FORMED FROM MINERAL OR ROCK MATERIAL WITH CONTROLLED PARTICLE SIZE DISTRIBUTION FOR THERMAL FILMS

CROSS REFERENCES TO RELATED APPLICATIONS

This application is a continuation of patent application Ser. No. 13/420,757 filed on Mar. 15, 2012 (now U.S. Pat. No. 8,795,427), which is a continuation of patent application Ser. No. 12/237,628 filed on Sep. 25, 2008 (now U.S. Pat. No. 8,182,601) which claims priority upon U.S. provisional application Ser. No. 61/124,498 filed Apr. 17, 2008, all of which are incorporated by reference herein.

The present invention relates to the art of fine grain nepheline syenite powder as a category in the nepheline syenite industry and more particularly to a novel ultra-fine nepheline syenite powder having controlled particle size especially designed for thermal films. Thermal films using the novel ultra-fine nepheline syenite powder constitutes a further aspect of this invention.

Although the preferred implementation of the present invention is a nepheline syenite powder, the invention can also be used to engineer the particle size distribution (PSD) of other minerals or rock materials for use in thermal films. Such powder with the novel selected PSD may also be used for other applications of films or coatings. Irrespective of this broad definition of the engineered PSD of mined natural occurring materials, the description shall concentrate on the preferred embodiment using nepheline syenite, which is a rock composition or material.

Background of Nepheline Syenite Powder

Unimin Corporation of New Canaan, Conn. is a leading source of mined raw nepheline syenite, which is a natural occurring rock formed from several minerals and is found in deposits in only limited areas of the world. The nepheline syenite industry has developed technology that is used for grinding and crushing raw nepheline syenite rock and then converting the particulated nepheline syenite into usable fine grain powder. Thus, the field to which the present invention is directed is the industry of nepheline syenite and the technology of converting nepheline syenite as mined into usable form that is a commercial powder. In about 2001, Unimin Corporation, after substantial research and development, invented an ultra-fine nepheline syenite powder, which powder was believed to be the smallest commercially available and economically producible nepheline syenite powder. This ultra-fine powder had a maximum particle or grain size D99 substantially above 20 microns. However, it was classified as "ultra-fine" nepheline syenite powder because it had a maximum particle size of less than about 20 microns. Such "ultra-fine" nepheline syenite powder had the smallest commercially available grain size. At about this time, Unimin Corporation invented a nepheline syenite powder that had a maximum particle size of about 20 microns and a minimum particle size of less than 1-2 microns, which was caused by a removal of very small particles or fines. This powder was developed as an anti-blocking agent and was sold under the trademark MINBLOC HC1400. The particle size distribution of MINBLOC HC1400 was over 15 microns between the D95 and D5 particle sizes, as shown in FIGS. 14 and 15. Such anti-blocking agent and other nepheline syenite powders designated as "ultra-fine" and having only a controlled maximum particle size were the prior art nepheline syenite powder closest to the ultra-fine powder of the present invention.

Thermal Film Using the Invention

The novel nepheline syenite powder of the present invention has properties developed to make it a superior filler for thermal films. Such films are used in a light transmitting canopy for a chamber or greenhouse for growing vegetation, such as plants and trees. A greenhouse has a canopy including a thermal film. Light radiation passes through the greenhouse canopy including a thermal film, so the light warms the interior of the greenhouse and facilitates absorption of sun rays by the plant life. The solar radiation passes through the canopy, including a thermal film, to the extent that the film has transparency. The amount of light and heat is determined by the transmittance of the film. At night, the temperature within the greenhouse drops according to the amount of energy transmitted back through the thermal film. A substantial drop in the temperature can cause the plants to suffer certain physiological damage. Thus, a thermal film is used in the canopy for the purpose of allowing energy from the sun to be transmitted into the greenhouse in the day time and then a reduced amount of heat energy to leave the greenhouse at night time, i.e. when the sun is not heating the greenhouse.

During day time, electromagnetic radiation from the sun passes through the thermal film. The constituents of solar energy are visible light and, to a lesser extent ultraviolet and near-infrared radiation. During the night time, the inside of the greenhouse radiates heat in the range of mid-infrared. This radiation is black-body radiation and happens to peak around 7 to 14 microns for objects that are at room temperature or slightly colder. It is this 7-14 microns mid-infrared radiation that the present invention traps to avoid heat loss of the greenhouse. The invention saves energy during periods that the temperature outside the greenhouse is lower than inside the greenhouse, especially during night time. Consequently, it has been found that nepheline syenite powder is very beneficial in use as filler for such thermal film. It is inexpensive and has a high visible light transmittance. The present invention utilizes the known advantages of nepheline syenite powder, while drastically reducing the amount of heat energy radiated back through the covering film. This loss of heat energy is measured as the thermicity of the film. Using the FTIR it is possible to measure the fraction (%) of infrared light in the range of 7-14 microns that passes through the film, which is called "thermicity." Consequently, the heat loss upwardly through the thermal film is defined as the "thermicity" which defines the amount of heat energy maintained in the greenhouse at times when the loss of heat by infrared radiation is reversed in the greenhouse. "Heat loss" in this description is the loss due to electromagnetic radiation and not due to other mechanisms, such as conductive heat transfer, which is insignificant.

The present invention is directed to an ultra-fine powder which maintains the advantages of nepheline syenite powder including its low cost and its free silica characteristic, which novel ultra-fine powder has a "tailored" particle size profile that allows the film to maintain high transmittance or transparency and with a dramatic reduction in thermicity. Nepheline syenite has the benefit of resulting in a thermal film that has high transparency or visible light transmission. It appears that this characteristic is due to the good match in refractive index between the film and nepheline syenite. This is a property of nepheline syenite. The particle size does not affect transparency. However, the particle size does affect thermicity. Thus, the invention uses this discovery. Of course, nepheline syenite also has the commercial advantage of not having any free silica. The invention is an ultra-fine powder, preferably nepheline syenite powder, with a "tailored" particle size profile where the particle size is approximately in the range of the wave length of the infrared radiation that is to be scattered back into the greenhouse. This concept is based upon Mie theory which suggests that particles scatter electromagnetic radiation (light) when they are of the same size as the radiation.

DEFINITIONS

Nepheline syenite is a rock in powder form constitutes a fine grain silica deficient silicate in the form of a sodium potassium alumino silicate. The maximum grain size as used herein is a target value defined as D99 or D95 and the minimum grain size as used herein is the target value defined as D5. The actual maximum particle size of the powder is really defined as size D99 and the minimum is the size D1. The terms "maximum" and "minimum" grain or particle sizes relate to targeted levels unless otherwise indicated. This is common usage in the small powder industry. The loading of nepheline syenite powder in a coating or film is defined as the percentage by weight of the filler in the receiving matrix. Substantially moisture free means less than 1.0% by weight of moisture and preferably less than about 0.8% by weight.

STATEMENT OF INVENTION

The present invention relates to a filler for thermal films, which filler has controlled minimum particle size D5 and is an "ultra-fine" nepheline syenite powder with a controlled maximum particle size D95. Control of the maximum size particles in the nepheline syenite powder is used to substantially reduce the abrasive properties of the filler when it is processed in the coating or film. Accurate control of the minimum size particles is used to reduce the gloss, improve clarity and reduce yellowing of the films. The nepheline syenite powder of the present invention shows low gloss or a matte finish and less abrasion to processing or application equipment. These properties are the result of using the novel ultra-fine nepheline syenite powder of the present invention. When used in a thermal film, the novel powder of the present invention has the primary objective of reducing thermicity while allowing excellent transparency.

The novel nepheline syenite powder of the present invention has a narrowed size between the maximum controlled grain size D95 and the minimum controlled grain size D5. This range is 10-12 microns. Consequently, the grain size distribution of the ultra-fine nepheline syenite powder of the present invention, impart very specific characteristics to the thermal film because of the narrow particle size distribution, and matching of the particle size to a selected part of the mid-range wave length of infrared light. Indeed, the new ultra-fine nepheline syenite powder of the present invention has a controlled maximum grain size D95 of about 15 microns and a controlled minimum grain size D5 of about 4-7 microns. This is substantially greater controlled size over any prior art. The grain size distribution between the controlled maximum grain size and the controlled minimum grain size is generally less than about 12 microns. This narrow range of grain size distribution imparts a specific and uniform physical property to the thermal film using as a filler the novel ultra-fine nepheline syenite powder of the present invention.

In accordance with an aspect of the present invention not only does the ultra-fine nepheline syenite powder include a controlled minimum grain size, but also includes an accurately controlled maximum grain size. By controlling both the upper and lower grain sizes of the "ultra-fine" nepheline syenite powder, the aforementioned narrow controlled range of particle size distribution is obtained. Another aspect of the invention is the fact that the novel nepheline syenite powder with a controlled minimum grain size of 4-7 microns and/or a controlled maximum grain size of less than 20 microns is manufactured by a feedstock which is a pre-processed nepheline syenite powder, having a maximum grain size of less than about 150 microns and, indeed, in the range of 20-150 microns. Thus, the present invention involved the processing of a previously processed nepheline syenite powder to have a preferred maximum grain size of 20-150 microns, but preferably about 100 microns.

In accordance with the present invention, there is provided a new ultra-fine nepheline syenite powder produced from a pre-processed nepheline syenite powder feedstock having a maximum grain size D99 of less than about 150 microns. The novel ultra-fine nepheline syenite powder of the present invention has a moisture content of less than 1.0% by weight and preferably less than 0.8% by weight. In accordance with the invention, this particle size distribution range D5 to D95 is less than about 10-12 microns. Consequently, the distribution of particles is in a very narrow range to give consistent and well defined physical characteristics to films using this new ultra-fine nepheline syenite powder.

In accordance with another aspect of the present invention, the novel ultra-fine nepheline syenite powder of the present invention is produced from the feedstock comprising a pre-processed nepheline syenite powder, which feedstock is processed by an air classifier. Indeed, the novel ultra-fine nepheline syenite powder is formed by various processes, one involving air classification, the other a series of air classifiers and the other a mill and air classifier in series constituting a continuous process. In accordance with an aspect of the present invention, the mill used in one method for producing the novel ultra-fine nepheline syenite powder is an air jet mill of the type using opposed air jets. When a series of air classifiers are used in the method for producing the novel ultra-fine nepheline syenite powder, one air classifier stage removes the upper grain size and another air classifier stage removes the lower grain size to produce the nepheline syenite powder having a very narrow particle range between a controlled maximum value and a controlled minimum value.

The novel ultra-fine nepheline syenite powder is produced in a continuous process whereby pre-processed nepheline syenite powder feedstock is passed through a series of air classifier stages or a batch method wherein the nepheline syenite powder feedstock is ground in an opposed jet mill and then classified internally and externally. The pre-processed nepheline syenite powder can be powder of the type having a maximum particle size of less than about 100 microns.

In accordance with a further major aspect of the present invention, there is provided a thermal film including ultra-fine nepheline syenite powder with a controlled maximum grain size D95 of about 15 microns and a controlled minimum grain size D5 in the range of about 4-7 microns and preferably about 5 microns. The ultra-fine nepheline syenite powder filler in the thermal film constituting this aspect of the present invention is added to the film with a loading factor of 5-25% by weight of the coating or film.

Nepheline syenite is naturally occurring rock constituting a mixture of Na feldspar, K feldspar and nepheline. (NaAlSiO4). It has a low level of free silicon dioxide. This material can be described as either syenitic or syenitic feldspar. Consequently, the present invention is applicable to nepheline syenite and also to other syenitic materials having drastically low free silicon dioxide. This general description of nepheline syenite is applicable to an understanding of the present invention and is used to define the nepheline syenite rock formation constituting the preferred material used in practicing the invention. This invention comprises a unique "ultra-fine" powder, use of such powder as a filler for thermal films and thermal films using this novel powder. The preferred material for making the powder is nepheline syenite and specifically commercial nepheline syenite powder with a maximum particle size in the range of 20-150 microns.

A primary aspect of the present invention is the provision of an ultra-fine powder substantially free of silica and formed from a naturally occurring mined substance with a controlled maximum grain size D95 of about 15 microns, a controlled minimum grain size D5 of about 4-7 microns and a D50 grain size in the general range of about 8-10 microns. This novel powder has a moisture content of less than 1.0% by weight and the maximum mode of the PSD curve for the novel powder is between 7-14 microns. As a feature of the invention, the particle size distribution between D95 and D5 is in the range of 10-12 microns. Thus, the powders have a controlled very narrow particle size distribution. The PSD curve is quite narrow. By profiling the particle size, the thermal films prepared with the ultra-fine powder as defined in the invention have an improved thermicity as measured in the range of 7-14 microns where there is maximum heat loss by radiation. This novel powder is "ultra-fine" to substantially increase transmittance of a film using the powder as a filler thereby allowing a high amount of incoming heat energy through the film. But a low thermicity imparted by the novel powder prevents a high amount of heat energy to be dissipated outwardly through the thermal film. As is well known, incoming heat from the sun is in the near-infrared range and the heat leaked from inside the greenhouse is in the mid-infrared range.

In accordance with the practical implementation of the invention, the powder having the particle profile that creates the above defined physical characteristics is an ultra-fine nepheline syenite powder. Thus, the advantages of nepheline syenite, including its low cost and high transmittance is obtained in the novel powder. Both the "ultra-fine" characteristics of the powder and the fact that the powder is nepheline syenite provides substantial advance in the filler for thermal films. The tailored particle size profile adds to these advantages by reducing thermicity and reducing the particle range between the controlled maximum particle size and the "controlled" minimum particle size. This narrow particle size span or range gives improved control over the properties of the film.

In accordance with another aspect of the present invention, there is provided a thermal film having fillers constituting the novel ultra-fine powder as defined above. In accordance with this aspect of the invention, the thermal film is selected from the class consisting of polyethylene and ethylene vinyl acetate. The loading of the filler is at least 5% by weight of the film. In accordance with an aspect of the invention loading at least 5% and preferably is in the general range of 5-25% by weight of the film.

In accordance with another aspect of the invention, there is provided an ultra-fine nepheline syenite powder produced from a feedstock constituting pre-processed nepheline syenite powder with a maximum grain size D99 in the range of 20-100 microns. This feedstock is pre-processed and may or may not be merely a commercially available nepheline syenite powder. The ultra-fine nepheline syenite powder produced from the feedstock has a moisture content of less than 1.0% by weight, a controlled minimum particle size or grain size D5 in the range of 4-7 microns and a controlled maximum grain size or particle size D95 of about 15 microns. The mean grain size or particle size D50 is in the range of 8-10 microns and the maximum node of the PSD curve for the powder is in the range of 7-14 microns.

Another aspect of the present invention is provision of an ultra-fine nepheline syenite powder, as defined above, wherein the starting feedstock is a commercial nepheline syenite powder; such as a commercial Minbloc powder. A pre-processed nepheline syenite powder is converted into a particle size distribution profile which involves removal of particles above a given grain size D95 of about 15 and below a grain size D5 of a selected amount, which selected amount is preferably 5 microns, but is in the range of 4-7 microns. In practice, the ground nepheline syenite feedstock has a medium particle size D50 of 15 microns and a maximum particle size D99 of 100 microns. The selected feedstock generally has a large fraction of particles in the 7 to 14 micron range. In accordance with an aspect of the invention the pre-processed feedstock has a D99 particle size greater than 20 microns and less than about 100-150 microns.

In accordance with a broad aspect of the present invention, there is provided a novel ultra-fine powder formed from a naturally occurring mineral or rock material with a refractive index (RI) of about 1.4-1.6. This refractive index is selected to produce a film generally transparent to visible light. Preferably, the refractive index is in the range of 1.46-1.57. The mineral or rock material having such values for the refractive index when the powder is in film has been found to be material selected from the class comprising silica (including ground natural and diatomaceous) cristobalite, feldspar, quartz, nepheline syenite, kaolin, alumina trihydrate, talc, attapulgite, pyrophyllite, calcium hydroxide, magnesium hydroxide and hydrotalcite, but preferably the class consisting of silica (including ground natural and diatomaceous), cristobalite, feldspar, quartz, nepheline syenite, kaolin, talc, attapulgite and pyrophyllite. This preferred classification has been processed as disclosed. By definition, "ultra-fine" powder is powder having a maximum particle size of less than about 20 microns wherein the maximum grain size is the D99 grain size. In accordance with this broad aspect of the invention, the ultra-fine powder has a particle size distribution tailored to correspond with the wave length of infrared light and is generally transparent to visible light.

In accordance with another broad aspect of the present invention, there is provided a novel ultra-fine powder formed from a mineral or rock material with a Mohs hardness of at least 5. As stated before, "ultra-fine" powder is powder having a maximum particle size of less than about 20 microns wherein the maximum grain size is the D99 particle size. In accordance with this aspect of the invention, the novel ultra-fine powder has a particle size distribution tailored or "engineered" to correspond with the specific PSD as defined in this disclosure. Whether the powder is defined by the Mohs number or by its refractive index, the ultra-fine powder of the present invention has a controlled particle size distribution with a maximum particle size D99, or preferably D95, in the range of 14-17 microns and a minimum particle size D5 in the range of 4-7 microns. It has been found that the preferred material is syenitic, such as nepheline syenite. However, when the material is selected based upon Mohs number, the mineral or rock material that is used as feedstock to form the novel ultra-fine powder is selected from the class comprising nepheline syenite, feldspar, silica, quartz, cristobalite and tridymite.

The use of any of these naturally occurring, mined materials having the PSD of the present invention reduces the thermicity of a thermal film, in which such powder is used as a filler. Indeed, the invention is the novel particle size engineered ultra-fine powder having a specific PSD.

In accordance with the preferred definition of the present invention, the maximum particle size D95 is about 14-17 microns and the minimum particle size D5 is about 5 microns. Furthermore, the D50 particle size is in the range of about 8-10 microns. In another aspect of this broad aspect of the invention, the ultra-fine powder has a moisture content that is less than about 0.20% by weight and preferably less than about 0.1% by weight. Indeed, in the preferred implementation the moisture content is less than about 0.08% by weight of the powder. These concepts constitute one of the broadest aspects of the present invention, which invention involves the use of a mined, naturally occurring mineral or rock material, which naturally occurring material is processed to have an engineered particle size distribution, which PSD is quite narrow and matches the wavelength of the infrared light spectra.

In accordance with an alternative implementation of the invention, the naturally occurring mineral or rock material used to produce the novel ultra-fine powder with the selected PSD, is a hard material having a Mohs number of at least 5. This mineral or rock material is used to practice the invention and is selected from the class of hard materials comprising nepheline syenite, feldspar, silica, quartz, cristobalite and tridymite.

In accordance with the preferred implementation of the present invention, the naturally occurring material, from which the ultra-fine powder is formed, has little or no free silica; however, in a broader aspect of the invention, this beneficial feature of substantially no free silica is merely a further definition of a preferred implementation of the present invention.

In accordance with another aspect of the present invention, there is provided a method of processing naturally occurring mineral or rock to be used primarily for thermal film. The preferred method of making the novel powder is a method comprising providing ground feedstock formed from a naturally occurring mineral or rock material having a refractive index of about 1.4-1.6, grinding the feedstock in an opposed jet mill, classifying the ground feedstock in the mill with a classifier to pass an intermediate powder from the mill. The intermediate powder has a maximum particle size of about 14-17 microns. Then, the intermediate powder is passed through an air classifier to remove particles having a particle size of less than 4-7 microns. This is the preferred method of producing the ultra-fine powder used for thermal film.

In accordance with another aspect of the present invention, there is provided an alternative method of producing the ultra-fine powder to be used in thermal film. This method involves providing a feedstock formed from a naturally occurring mineral or rock having a refractive index of about 1.4-1.6. The feedstock is then ground and an intermediate powder is produced by passing the ground feedstock through a first air classifier to remove particles having a first size greater than a value in the range of 14-17 microns. Thereafter, the intermediate powder is passed through a second air classifier to remove particles having a second size less than a value in the range of 4-7 microns. This method is an alternative method developed for producing ultra-fine powder for use in making thermal film. The starting material for this method has been found to be a material selected from the class comprising silica (including ground natural and diatomaceous), cristobalite, feldspar, quartz, nepheline syenite, kaolin, talc, attapulgite and pyrophyllite.

The primary object of the present invention is the provision of an ultra-fine powder having a tailored particle size profile created to improve properties of thermal films. The tailored profile involves a controlled maximum particle size, a controlled minimum particle size and with the range of these particles sizes being between about 4 microns and about 15 microns. In this manner, the particle size distribution matches a selected range of the infrared radiation spectra, which range controls the thermicity of a film using the ultra-fine powder. The powder is preferably nepheline syenite and is produced from pre-processed nepheline syenite powder. However, the powder can be of a syenite material, which means a material that is composed of the Na and K feldspar with little or no silica.

Another object of the present invention is the provision of an ultra-fine powder formed from a mineral or rock material with a Mohs hardness of at least 5, wherein the powder has a controlled or "engineered" particle size distribution (PSD) with a maximum particle size, preferably D95 in the range of 14-17 microns and a minimum particle size D5 in the range of 4-7 microns. In this manner, a majority of the engineered powder matches a selected range of the infrared radiation spectra, which range controls the thermicity of the film using the ultra-fine powder as a filler. The powder is formed from a mined material having the aforementioned engineered particle size distribution, which PSD is narrow and matches properties of infrared light. However, a further object is the use of this ultra-fine powder in various films and coatings to reduce thermicity or to obtain other specific properties, such as hardness. The preferred starting material for this object is material selected from the class comprising nepheline syenite, feldspar, silica, quartz, cristobalite and tridymite.

Yet another object of the present invention is the provision of an ultra-fine powder formed from a mineral or rock material having a refractive index in the range of 1.4-1.6 and preferably in the range of 1.46-1.57. This material forms the feedstock to produce powder having the controlled or "engineered" particle sizes defined in this application which particle sizes have a maximum value of either D99 or D95 in the general range of 14-17 microns and a minimum particle size D5 in the general range of 4-7 microns. Preferably, irrespective of the definition of the feedstock used in making the ultra-fine powder, the maximum particle size is about 15 microns and the minimum particle size is about 5 microns. The selection of the feedstock by either a Mohs number of at least 5 or by a refractive index in the general range of 1.4-1.6 does not change the ultimate characteristics of the novel powder, which ultimate characteristics include an engineered maximum grain size in the range of 14-17 microns and a minimum grain size in the general range of 4-7 microns. To provide an ultra-fine powder where the refractive index is a part of the invention, the starting material is selected from the class comprising silica (including ground natural and diatomaceous), cristobalite, feldspar, quartz, nepheline syenite, kaolin, alumina triydrate, talc, attapulgite, pyrophyllite, calcium hydroxide, magnesium hydroxide and hydrotalcite. The preferred starting material for this object is material selected from the class comprising silica (including ground natural and diatomaceous), cristobalite, feldspar, quartz, nepheline syenite, kaolin, talc, attapulgite and pyrophyllite. These materials have been processed as herein disclosed.

In accordance with even yet another object of the invention, the tailored particle size profile has a "controlled" D95 size, a "controlled" D5 size and a specific D50 size to provide a powder having a narrow spread between the D5 and D95 particle sizes.

In accordance with the invention, there is provided a thermal film using the novel filler powder having a tailored particle size profile and other features mentioned above.

Another object of the present invention is the provision of an ultra-fine nepheline syenite powder that allows for more visible light to pass through a thermal film using the powder as a filler. The fine particle size profile and the fact that nepheline syenite powder is used, instead of another mineral powder, contributes to an increased transmittance. Thus, more visible light, and in particular photo synthetically active radiation (PAR), passes through the thermal film to promote photosynthesis. The thermal film using the ultra-fine nepheline syenite powder of the present invention can be loaded higher without sacrificing too much incoming solar energy. With high loading, the thermal film can be made less expensive since the resin costs more than the filler. The thermicity of the highly filled thermal film is substantially lower than for films with other fillers. Indeed, the more thermal filler used, the better the thermicity. Consequently, the first benefit of the new powder is less heat loss. A secondary benefit is that the film can be made cheaper. In summary, by using nepheline syenite powder with a tailored particle size parameters of the present invention, the thermal film may be loaded to a high amount in the general range of 20-25% by weight while still maintaining a high transmittance and a low thermicity. As indicated the loading is at least 5% by weight of the film. The low thermicity characteristic is obtained by selecting the controlled maximum grain size and the controlled minimum grain size to match a particular wave length range of infrared light that transmits heat energy in the reverse direction through the film using the novel powder as a filler. The particle size of the new powder is "controlled" to approximately the range of the infrared radiation to be scattered back into the greenhouse. This property utilizes the Mie theory mentioned before.

Representative Particle Systems

It is instructive to explain certain designations and nomenclature described herein. Particle sizes, unless indicated otherwise, are given in microns, $10^{-6}$ meters. As will be appreciated by those skilled in the art, particle sizes are expressed in diameters. Although diameters imply a spherical or round shape, the term diameter as used herein also refers to the span or maximum width of a particle that is not spherical. Typically, ranges of particle sizes or size distributions are noted. For example, for a range of 5 to 15 microns, a designation of "5×15" is typically used. Another designation used herein is "$D_n$," where n is some numerical value between 0 and 100. This value refers to a proportion or percentile of particles having a certain maximum diameter. For example, in a particle population having a target size of 0 to 18 microns, for instance, the median maximum diameter (D50) may be 2.5 microns, the largest diameter in the $99^{th}$ percentile of the population (D99) may be 16 microns, and the largest diameter in the $1^{st}$ percentile of the population (D1) may be 0.1 microns.

In accordance with the present invention, certain nepheline syenite particle systems with particular size distributions and characteristics have been discovered. The preferred embodiment nepheline syenite particle systems are a 4×15 system, a 5×15 system, and 6×15 system. These systems exhibit surprisingly and unexpected beneficial physical properties including, but not limited to, reduced abrasiveness, reduced gloss, reduce friction, lower oil absorption, or higher loading, better rheology and lower thermicity. Tables 1-3 set forth below, present typical, preferred, and most preferred values for the D1, D50, and D99 size characteristics of initial embodiments of nepheline syenite particle systems in accordance with the present invention. All particle sizes noted are in microns.

TABLE 1

4 × 15 Embodiment Particle System

|  | $D_1$ | $D_{50}$ | $D_{99}$ |
|---|---|---|---|
| Typical | 0.9-3.7 | 7.9-9.7 | 14.3-17.1 |
| Preferred | 1.3-3.3 | 8.3-9.3 | 14.7-16.7 |
| Most Preferred | 1.8-2.8 | 8.8 | 15.2-16.2 |

TABLE 2

5 × 15 Embodiment Particle System

|  | $D_1$ | $D_{50}$ | $D_{99}$ |
|---|---|---|---|
| Typical | 3.3-6.1 | 8.4-10.4 | 14.6-17.5 |
| Preferred | 3.7-5.7 | 8.9-9.9 | 15.1-17.1 |
| Most Preferred | 4.2-5.2 | 9.4 | 15.6-16.6 |

TABLE 3

6 × 15 Embodiment Particle System

|  | $D_1$ | $D_{50}$ | $D_{99}$ |
|---|---|---|---|
| Typical | 3.1-5.9 | 9.1-11.1 | 16.5-19.4 |
| Preferred | 3.5-5.5 | 9.6-10.6 | 16.9-18.9 |
| Most Preferred | 4.0-5.0 | 10.1 | 17.4-18.4 |

In one aspect, the present invention relates to particle systems of nepheline syenite having particular size ranges which exhibit unique and unexpected properties. The nepheline syenite particle systems have a relatively small particle size for the upper size limit i.e. the powder is "ultra-fine", and a relatively "tight" particle size distribution. For example, in a preferred embodiment particle system, the system has a median or D50 size of 8-11 microns, a lower or D1 size of 2-5 microns, a D5 size of 4-7 microns, a D95 size of about 15 microns, and an upper or D99 size limit of 15-20 microns. The term D95 having a target of "about 15 microns" may have a range of up to about 17 microns.

Yet another object of the present invention is the provision of a thermal film using the novel filler powder, preferably nepheline syenite powder, which powder has the characteristics mentioned above.

Another object is provision of an ultra-fine powder used for a filler, which filler has a controlled minimum and maximum particle size to produce a tailored PSD curve. Such filler is formed from naturally occurring rock formations, but preferably nepheline syenite.

These and other objects and advantages are part of the disclosure and will become more apparent in the following description taken together with the accompanying drawings.

BRIEF DESCRIPTION OF DRAWINGS

FIG. 7 is a table of the target particle sizes of several samples of ultra-fine nepheline syenite powder, including nepheline syenite powder in accordance with the present invention and setting forth the particle size distribution between D1 and D99.9 where the target values are D5 and D95 of the samples;

FIG. 25 is a table defining the parameters for operating the fluidized bed jet mill used in the practice of the second preferred embodiment illustrated in FIG. 24;

FIG. 26 is a table of the type disclosed in FIG. 25 illustrating the operation of the air classifier in the second preferred embodiment of the present invention showing in FIG. 24;

FIG. 27 is a specification sheet for the novel powder product by the method defined in FIGS. 23-26B.

Having thus defined the drawings, further features of the invention will be hereinafter described.

DESCRIPTION OF PREFERRED EMBODIMENTS

Figure 1:
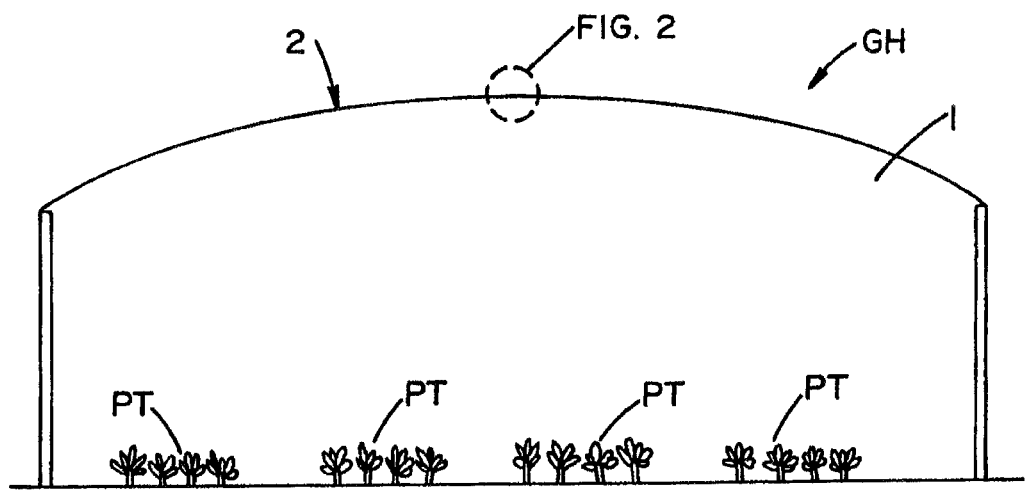
FIG. 1 is a schematic diagram of a greenhouse illustrating a canopy of the type using a thermal film to control the cooling temperature within the greenhouse.
Figure 2:
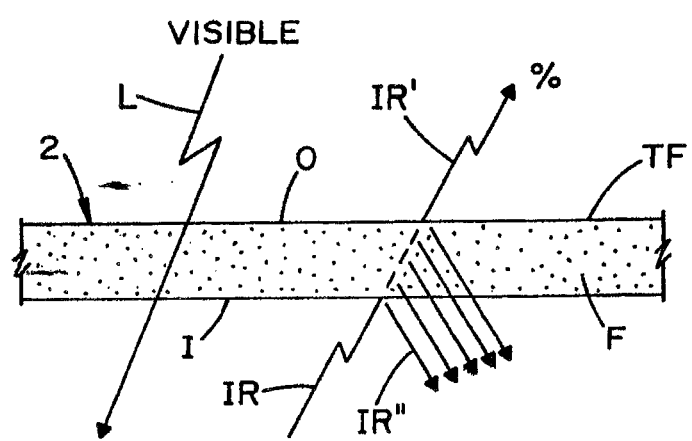
FIG. 2 is an enlarged schematic representation from the circular portion in FIG. 1 graphically illustrates the intended function and purpose of a thermal film.
Figure 16:
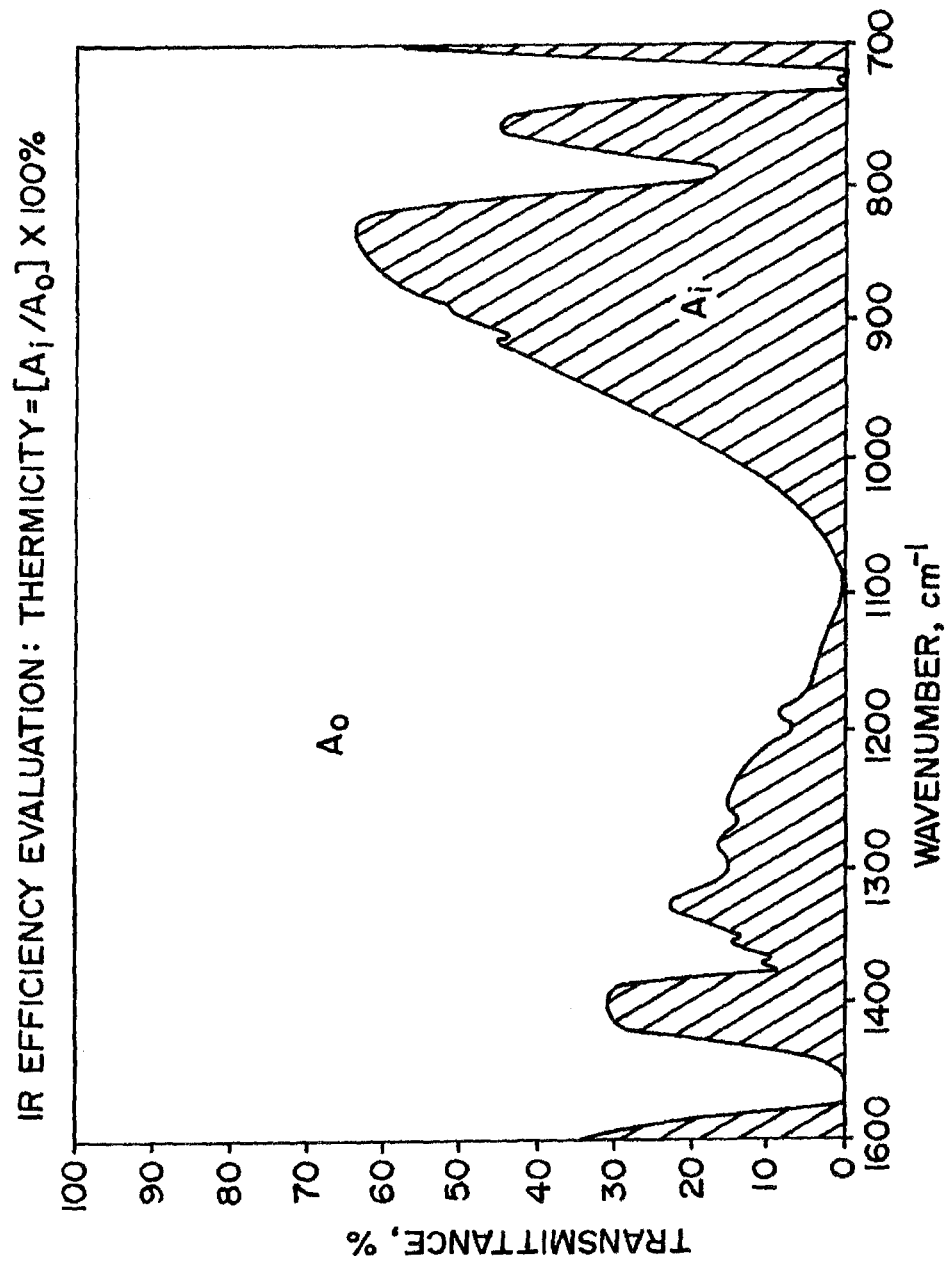
FIG. 16 is a graph for defining "thermicity" property as used in describing the present invention.

Referring now to the drawings wherein the showings are for the purpose of illustrating the preferred embodiments of the invention only and not for the purpose of limiting same, FIG. 1 shows greenhouse GH having an internal growing chamber 1 with a transparent structure called the "greenhouse cover film" or canopy 2 to allow sunlight into chamber 1 for the purpose of growing plants PT. In accordance with standard practice, canopy 2 includes thermal film TF, as best shown in FIG. 2. Although the film is described for use over a greenhouse, it can be used in various, well known applications. The thermal film has an outside surface O and an inside surface I. Visible light rays L are transmitted through film TF into chamber 1 for the purpose of promoting photosynthesis to facilitate growth of plants PT. The amount of heat energy transmitted from the outside to the inside of film TF is referred to as transmittance that will be explained in more detail with respect to FIG. 20. During the day, radiation L from the sun passes thermal film TF of greenhouse GH. At night, heat in chamber 1 is dissipated as infrared rays IR passing outwardly through film TF. The amount of heat loss is illustrated schematically as rays IR'. It is necessary to maintain heat in chamber 1; therefore, it is essential that the heat loss by radiation through the film is minimized and reflected back into the chamber as indicated by rays IR". Thermicity is the fraction of infrared light in the range of 7-14 microns that pass outwardly from chamber 1 through film TF as shown in FIGS. 1 and 2. This fraction can be measured with the FTIR spectrometer. In FIG. 16 the fraction that passes is Ai and the total amount of infrared radiation is Ao, which is the total area from 7-14 microns. Thermal film TF now includes fillers F in fine powder form to reduce the cost of the film. These fillers also have the tendency to reduce light passing through the film and to increase the amount of reflective infrared energy to hold the heat within greenhouse GH. The present invention is directed to a novel ultra-fine powder having a controlled minimum particle size D5 and a tailored particle size profile. This film is specifically tailored to be filler F in thermal film TF. "Ultra-fine" indicates that the maximum grain size D95 is less than about 20 microns. By using nepheline syenite powder there is an increased transmittance so that more visible light or daylight enters the greenhouse. More light increases the photosynthesis in the growing chamber. By using an ultra-fine nepheline syenite powder, as in the present invention, higher loadings (5-25%) can be employed without sacrificing too much visible light or heat energy passing through the film. Consequently, thermal film TF using ultra-fine nepheline syenite powder, especially the powder of the present invention, can be made cheaper since the resin cost are more than the filler cost. The filler has the attributes of "ultra-fine" nepheline syenite powder. The thermicity of highly loaded filled films is reduced to decrease the amount of heat energy lost when sunlight is no longer creating greenhouse heat. The present invention relates to the nepheline syenite powder that is "ultra-fine" and results in a film having a high transmittance even with high loading and a low thermicity to maintain the heat within the greenhouse. This invention relates to the art of nepheline syenite powder, particularly to an "ultra-fine" nepheline syenite powder which has a controlled maximum grain size or particle size D95 of about 15 microns and a controlled minimum grain size or particle size D5 at a level in the range of 4-7 microns. The concept of controlling the minimum grain size is novel in the nepheline syenite powder art or technology. However, the present invention goes beyond this novel concept and increases the overall advance of the tailored ultra-fine nepheline syenite powder to allow increased transmittance or transparency and decreased thermicity for the film in which the novel powder is used as a filler. The development and definition of the ultra-fine nepheline syenite powder with a tailored particle size profile and methods of producing such novel powder are hereinafter described utilizing the drawings, which showings are not intended to be limiting, but only illustrative.

The invention involves a novel ultra-fine nepheline syenite powder having a very narrow particle size distribution so that distinct and repeatable physical enhancements are created in thermal films. The novel ultra-fine nepheline syenite powder has a controlled minimum particle size of 5-7 microns. This controlled minimum particle size lowers oil absorption, allows higher loadings in thermal films, and produces higher clarity films with less yellowing and lower thermicity. Indeed, the embodiment of the invention having a minimum grain size D5 of 4-7 microns and a maximum grain size D95 of about 15 microns improves rheology and reduces thermicity of thermal films.

The inventive aspect of the novel ultra-fine nepheline syenite powder is that the minimum particle size or grain size D5 of the produced powder is controlled to a value in the range of about 4-7 microns. These are target values which are used to define the product even though the minimum grain size or particle size may vary slightly from the targeted value since control of a particle size of this low magnitude results in a certain size deviation. Control of the minimum grain size to a level of 4-7 microns is unique. Such controlled particle size reduces gloss, improves clarity and reduces yellowing. A thermal film using the novel nepheline syenite powder having a controlled minimum grain size of 4-7 microns has a low gloss or a matte finish. The Mohs hardness of nepheline syenite powder is in the range of 6.0-6.5 which is quite hard for fillers and imparts hardness to the coating or film. This characteristic of nepheline syenite powder together with the fact that nepheline syenite powder has virtually no free silica makes the powder quite useful in both coatings and thermal films. Such powder can be used at higher loading levels, such as 20-25% by weight, to reduce the overall cost of the film. This capability is a further advantage of using the present invention. The control maximum grain size reduces the abrasive properties of the new nepheline syenite powder as it is used to enhance the physical properties of the films, as so far described. After extensive research and development it has been discovered that the novel ultra-fine nepheline syenite powder can be produced by two preferred types of powder production methods, as so far described and as set forth in more detail in the various drawings of this application. The first type of method for producing the desired ultra-fine nepheline syenite powder of the present invention has been so far described and is illustrated in more detail in FIGS. 3-11. The type of second preferred production method has also been described generally and is presented in more detail in FIGS. 21-27 and characteristics and properties of the novel powder are disclosed in FIGS. 12-20.

Novel Ultra-Fine Nepheline Syenite Powder

Figure 8:
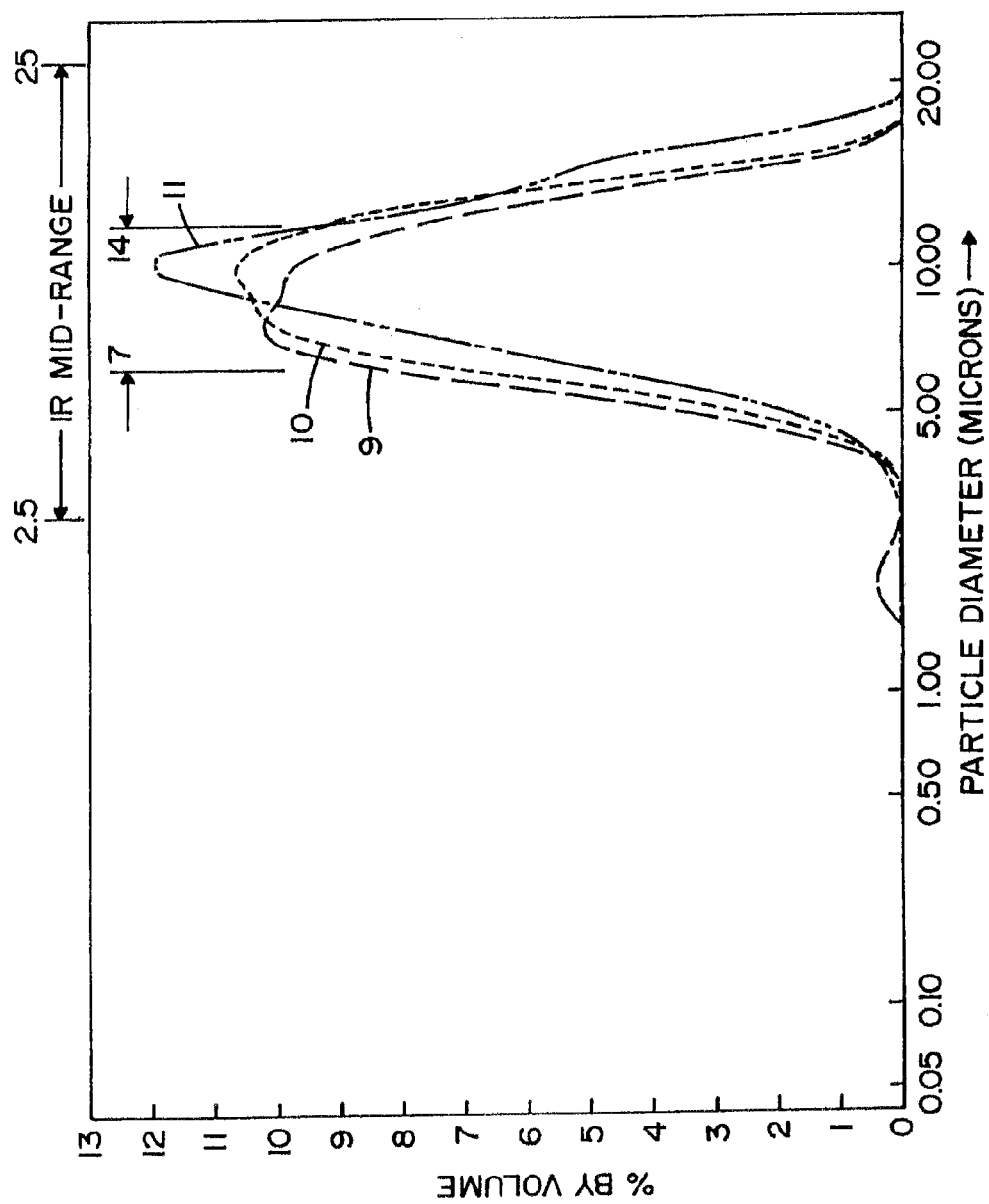
FIG. 8 is a PSD curve of the "bell curve" type illustrating an ultra-fine nepheline syenite powder with a controlled minimum grain size of 4-6 microns as discussed in FIG. 7 with the relationship with the infrared light wave length spectra and showing the maximum nodes of the samples.
Figure 10:
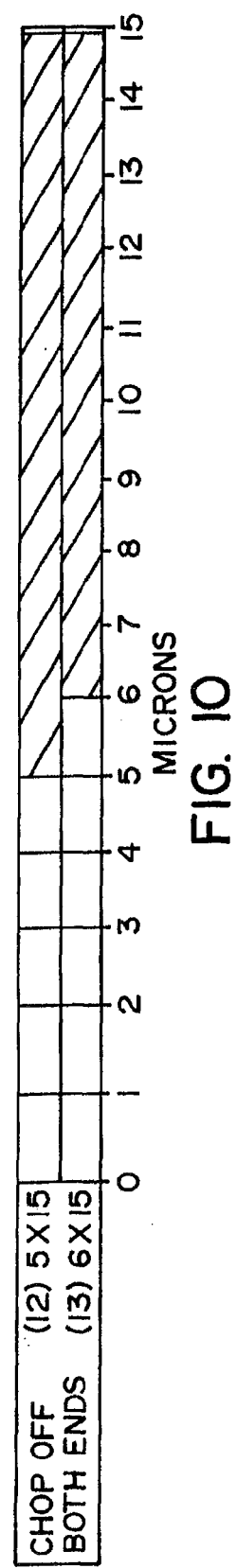
FIG. 10 is a graph similar to FIG. 9 showing powder samples (12) and (13) produced by the preferred method of practicing the present invention.
Figure 11:
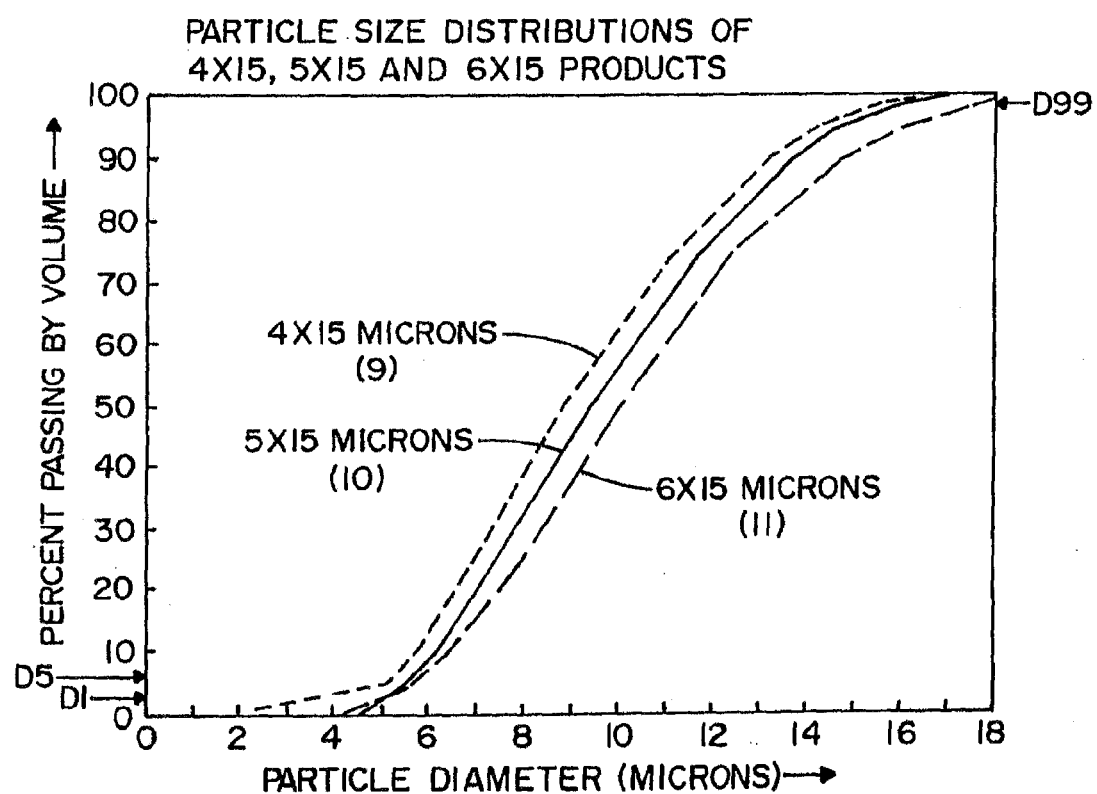
FIG. 11 is a type of PSD curve showing tailored particle size characteristics of samples (9)-(11) which is similar to the other type of PSD curve illustrated in FIG. 8, which is a "bell" curve revealing the maximum node of the samples.
Figure 20:
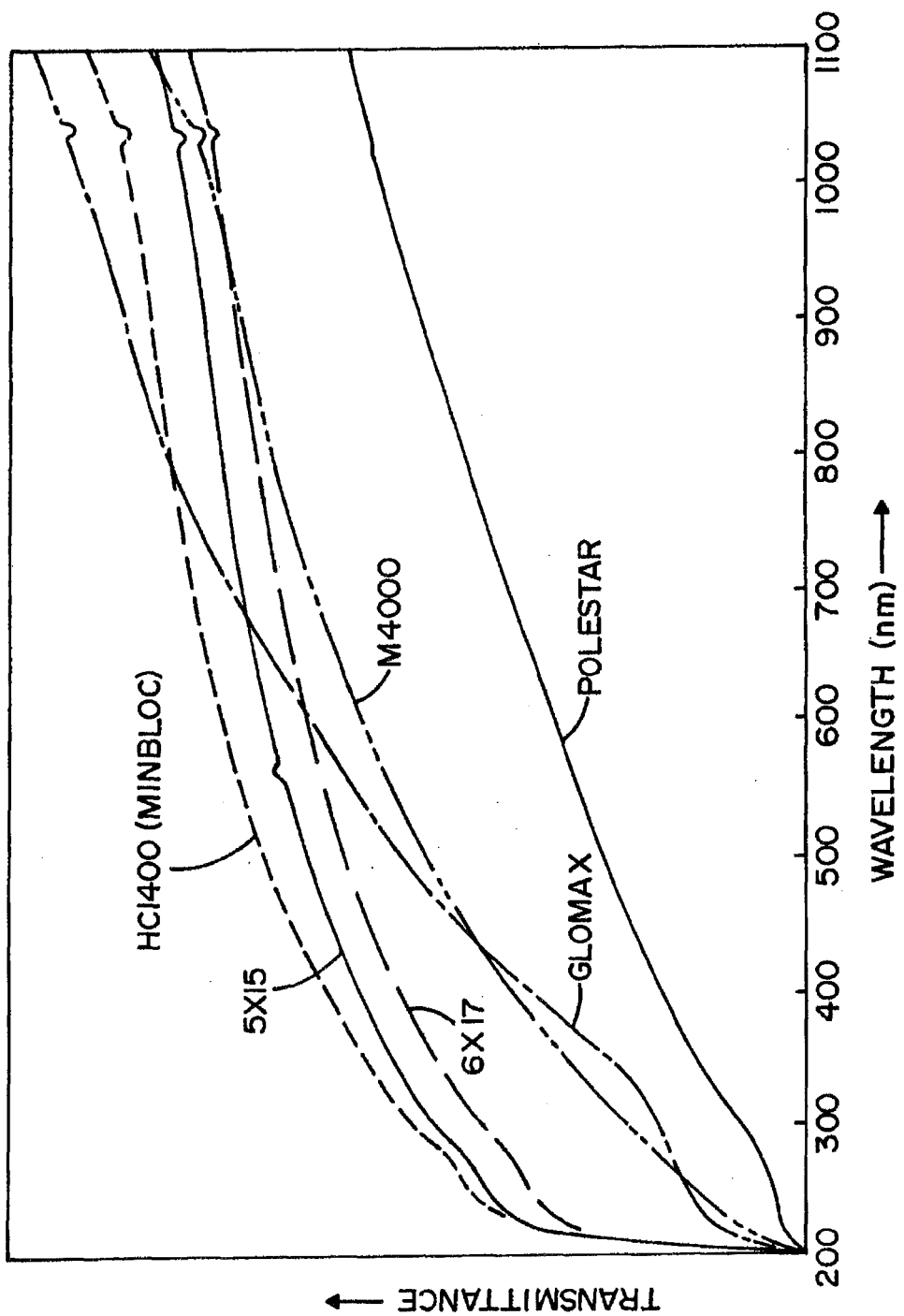
FIG. 20 discloses curves illustrating the transmittance of certain examples of the present invention compared to prior art fillers M4000, Glomax and Polestar as now used in thermal films.

As so far described, the present invention relates to an ultra-fine nepheline syenite powder that is tailored for use in thermal film as described in connection with FIGS. 1 and 2. Preferred samples of this novel powder are illustrated in the table of FIG. 7 wherein samples (9)-(11) produced in accordance with the present invention are set forth with respect to the tailored grain size profile of the powder. The powder is "ultra-fine" with a particle size D99 less than about 20 microns. An ultra-fine nepheline syenite powder with a controlled maximum grain size inherently has good transmittance. The optical properties of nepheline syenite allows for high loading. In the samples, the controlled minimum grain size D5 has a targeted particle size of 4 microns, 5 microns or 6 microns. Production methods for these novel nepheline syenite powders tailored for thermal film will be explained later. As illustrated in FIG. 8, the particle size distribution curve of the samples in FIG. 7 are provided as "bell" curves 9, 10 and 11, respectively. The particle size profiles are concentrated in the area of the infrared spectra defined by 7-14 microns. The mid range of infrared energy is about 2.5 microns to 25 microns as designated in FIG. 8. In accordance with the invention, the novel powder of the invention is concentrated in the very limited range of 7-14 microns. This is the range that corresponds to the infrared wave length that defines thermicity, i.e. in the middle of the mid range. This is a further distinguishing feature of the present invention. In summary the particle size tailored nepheline syenite powder has a controlled maximum grain size D95 of about 15 and a controlled minimum grain size D5 at a level in the range of 4-7 microns. The maximum particle size node is in the range of 7-14 microns. Samples (9)-(11) are produced from a pre-processed nepheline syenite powder processed to have a maximum grain size D95 substantially greater than 20 microns by controlling both the maximum grain size D95 and the minimum grain size D5 as recorded in FIG. 10. Of course, in accordance with an aspect of the present invention the novel nepheline syenite powder can be produced by starting with or processing a nepheline syenite powder to have a controlled maximum grain size D95 of about 15 microns. Then, the process for making the novel nepheline syenite powder having a controlled minimum grain size D5 of 4-7 microns merely removes particles having a grain size less than the selected minimum targeted D5 particle size. This production concept is disclosed by the grain size profiles disclosed in the table of FIG. 9. In both instances, the desired novel nepheline syenite powder has a PSD curve such as shown in FIGS. 8 and 11 wherein the D5 grain size is in the general range of 4-6 microns and the maximum controlled grain size D95 is about 15 microns. The curve of FIG. 11 corresponds to the curves of FIG. 8. Both types of curves are particle size distribution curves, with the curve of FIG. 8 being a "bell" shaped concept and the curve of FIG. 11 being a percentage distribution type PSD curve. These two types of curves both illustrate the preferred novel ultra-fine nepheline syenite powder samples (9)-(11) of FIG. 7. Having thus described the tailored ultra-fine nepheline syenite powder of the present invention as used for a thermal film described with respect to FIGS. 1 and 2, details of certain methods and characteristics learned and developed in the development of the novel powder are hereinafter described. Fillers for thermal film control the thermicity and transparency properties to the thermal film used to construct greenhouses as shown in FIG. 1 and FIG. 2. Films TF allow visible light to pass a limited heat loss during night time while reflecting back infrared radiation at night. The films are typically polyethylene or ethylene vinyl acetate resins. A range of filler powders have been used in thermal films; however, the present invention relates to nepheline syenite which has substantially no free silica and more particularly to tailoring the particle size distribution or profile for the nepheline syenite powder. The thermal performance of the filler in the resin is referred to as thermicity of the film, which is the fraction of infrared light that passes the film in the range of 7-14 microns as described in FIG. 16 and as measured for a specific prior art filler Minbloc HC1400 in FIG. 17. The basic advantage of the present invention is the provision of a nepheline syenite powder having a controlled maximum grain size and a controlled minimum grain size. In accordance with this basic novelty, the maximum grain size of the invention is about 15 microns and the minimum grain size is a value in the range of 4-7 microns. This tailored grain size profile provides excellent transmittance, as shown in FIG. 20, a reduced tendency to settle during production of the film and less wear on equipment used in making the film. By controlling the minimum particle size D5, the range of particle size distribution is generally no more than 10-12 microns so that the novel powder has a profile with a narrow particle size span and will, thus, perform consistently when mixed with resin to produce a thermal film. Such advantages of the novel concept of controlling both the maximum grain size and the minimum grain size in a powder which is indeed "ultra-fine" (with a maximum grain size of less than about 20 microns) is enhanced by the added feature of reducing the transmicity by concentrating the tailored particle size distribution in the wave length of infrared light corresponding with a spand or spectra of 7-14 microns. Thus, the present invention relates to the concept of a tailored nepheline syenite powder which is ultra-fine, has controlled maximum grain size, has controlled minimum grain size and has a distribution generally in the range of 7-14 microns. The tailored particle size of the ultra-fine nepheline syenite powder also creates a narrow particle size distribution in the range of about 10-12 microns.

The new nepheline syenite powder greatly enhances the performance of a thermal film. The preferred implementation of the invention is a powder such as sample (10) of FIG. 7 having a maximum grain size D95 of 15 microns and a minimum grain size D5 of 5 microns. The transmittance, or the ability to allow any incoming light, is graphically illustrated in FIG. 20 and compared with prior art powder fillers Glomax, Polestar, M4000 and Minbloc HC1400. Minbloc HC1400 is the prior nepheline syenite powder improved by the new powder. The transmittance of the preferred implementation of the present invention is generally the same as Minbloc HC1400. Transmittance of the thermal films is important for wave lengths in this range because 300 nm is the cut-off for solar radiation. Consequently, transmittance only up to about 300 nm wave length indicates how much solar light passes through the film. Nepheline syenite is more transparent over the whole range of radiation emitted by the sun, including the important PAR range (photosynthetically active radiation), which is the radiation crops use for photosynthesis. In this wave length range, the nepheline syenite powders are substantially superior to other prior art fillers. The preferred 5×15 powder is about the same as Minbloc HC1400 and the embodiment 6×17 is in the same general area of high transmission. Nepheline syenite powders including the embodiments 5×15 and 6×17 allow light energy transmitted into the greenhouse substantially better than fillers which are not nepheline syenite powder. Thus, transmittance of the novel powder is high. Thermicity and transmittance of a film is calculated and determined in a manner described in FIGS. 16 and 17. By this standard procedure, a thermal film using the novel powder has been found to have a quite low thermicity as recorded in FIGS. 18 and 19. The parameter is in the neighborhood of about 19%, i.e. less than 20%. Thus, the present invention has the advantages of controlled minimum grain size with a low spread between the maximum controlled grain size and the minimum controlled grain size. The controlled particle size spread is between 10-12 microns. This is an advantage over all prior art fillers for thermal films.

Figures 18, 19:
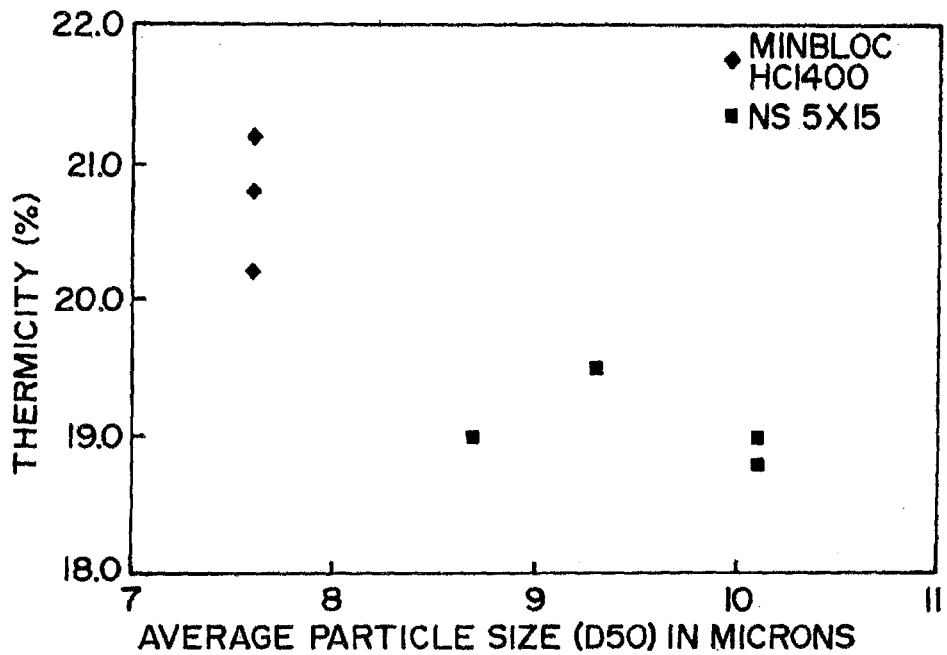
FIG. 18 is a plot of the thermicity for a film using the preferred tailored nepheline syenite powder compared to the thermicity of a film using the closest existing nepheline syenite powder, i.e. Minbloc HC 1400.
FIG. 19 is a table of the thermicity of a film using the preferred novel nepheline syenite powder and the thermicity of the same film using the closest nepheline syenite powder as shown in FIG. 14.

A film using the novel nepheline syenite powder of the present invention has a high transmittance as shown in FIG. 20 and a low thermicity as disclosed in FIGS. 18 and 19. Thermal films tested for the results in FIGS. 18 and 19 were compounded from LDPE resin having a thickness of 100 microns. These films were prepared with fillers formed from powders having the novel concept of controlling the particle size profile. The loading was 10%. These films used the novel powders and are identified in FIG. 19 as NS 6.0×16.5 (6×17), NS 6.0×16.5 (6×17), NS 4.9×15.2 (5×15) and NS 5.1×15.6 (5×15). The thermicity of these films using the preferred embodiment 5×15 and the alternative embodiment 6×17 had a measured thermicity of about 19%, i.e. less than 20%. This value is compared to the measured thermicity of about 21% for a film using the closest prior filler as reported in the table of FIG. 19. This is a substantial reduction of the thermicity of a film using the present invention when compared to a film including the closest prior art Minbloc HC1400. The results of the thermicity measurements are reported in the plot of a fitted model based upon the D50 particle size as shown in FIG. 18. Consequently, the thermicity of a film using the present invention is substantially less than 20%. This compares with the thermicity of film using prior nepheline syenite Minbloc HC1400 which is substantially greater than 21%. This comparison is shown in FIGS. 18 and 19. The thermicity of the film is improved by optimizing the particle size distribution to create a tailored particle size profile.

Figure 14:
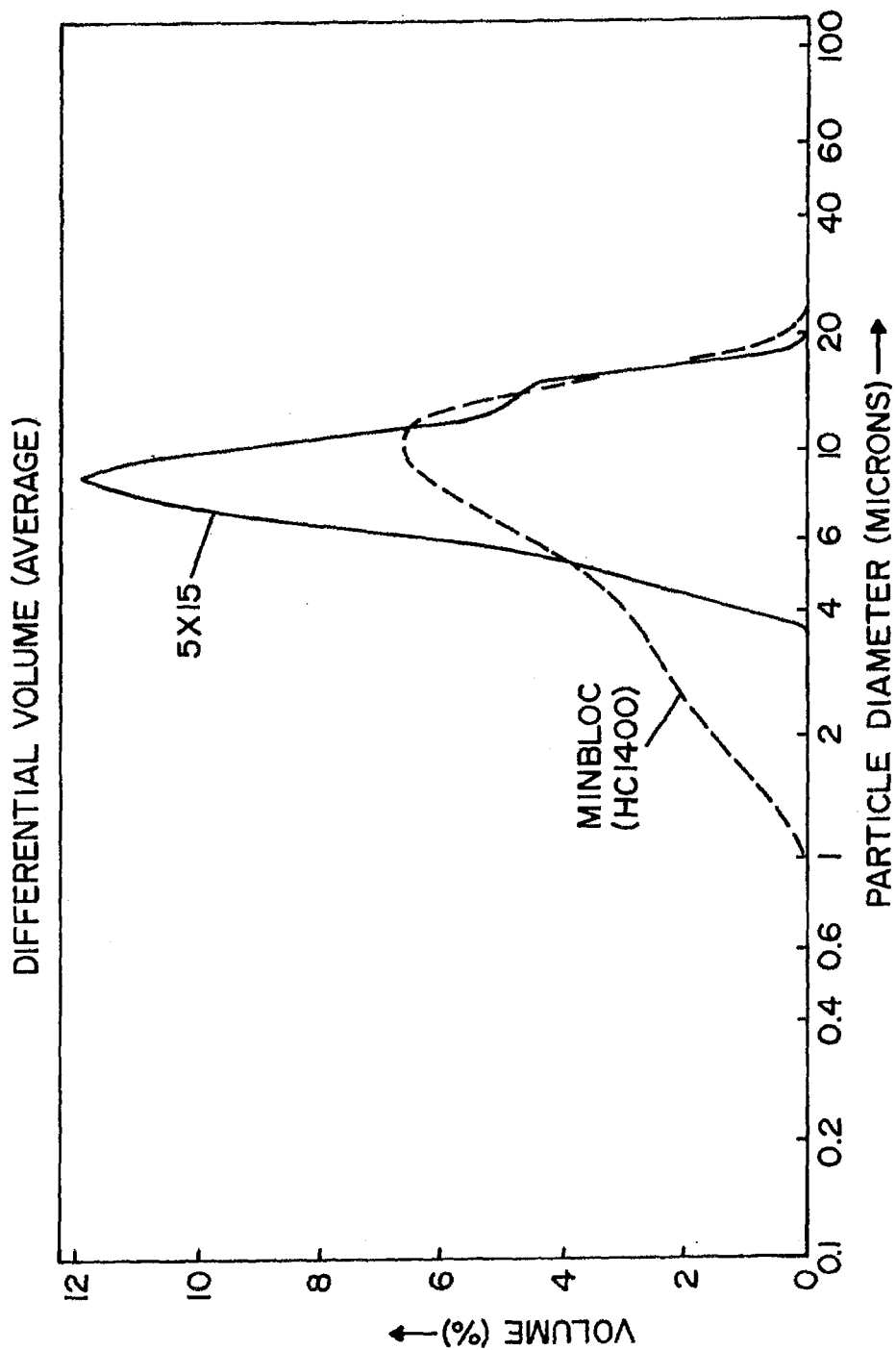
FIG. 14 is a bell curve type of PSD curve comparing the preferred embodiment of the present invention with the closest existing nepheline syenite powder.
Figure 15:
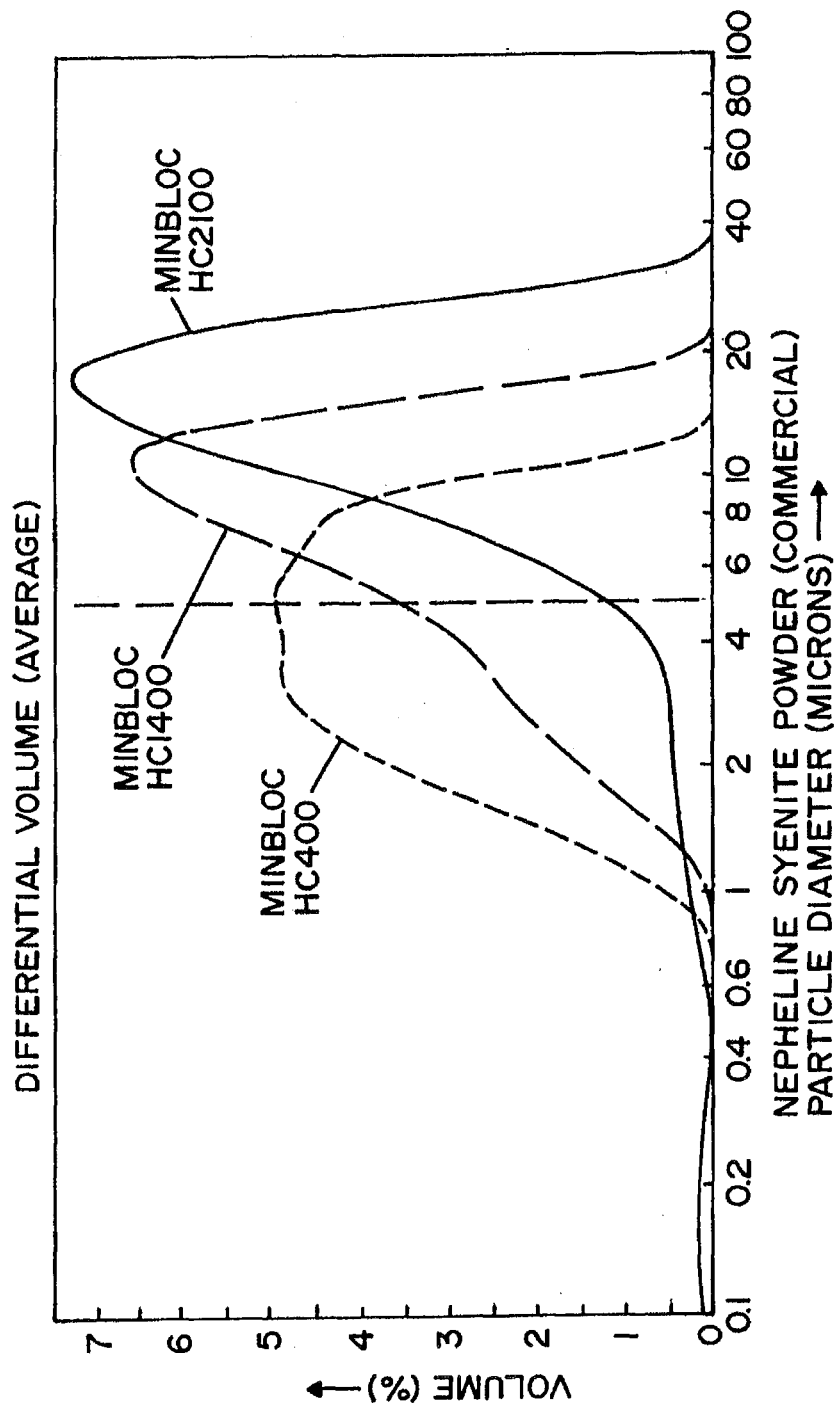
FIG. 15 are several "bell" curve type PSD curves for nepheline syenite powder now used as fillers in thermal film and showing the distinction between these curves and the corresponding curve of the preferred embodiment of the invention illustrated in FIG. 14.

Light transmission is affected by both light absorption and scattering. These two properties are not easily distinguished. The particle size greatly affects scattering. By adjusting the particle size, scattering and thereby light transmission can be controlled in accordance with the present invention. Current grades of nepheline syenite powder produce results in a filler for thermal film that has a size distribution that is very wide and skewed toward the large particle size. For instance Minbloc HC1400, as shown in FIGS. 14 and 15, has a size ranging from D5 of 2 microns to a D95 particle size of over 15 microns. There is a maximum mode above 10 microns and about 15 microns as shown in FIGS. 14 and 15. The improved thermicity of a film using the present invention is obtained by the tailored particle size profile with a particle size PSD curve that matches a 7-14 microns wave length. This is the general center of the wave length mid-range and increases the energy reflected by the thermal filler of the film. Nepheline syenite with a particle size distribution of D5 equals 5 microns and D95 equals about 15 microns. This film has a better thermicity than a film using the particle size distribution currently available in other nepheline syenite powders. Thus, high transmittance and other advantageous properties of using nepheline syenite powder as a filler for thermal films are combined with the advantages of (a) controlled minimum grain size and (b) narrow particle size range to reduced the thermicity of the film. In FIG. 14 where the 5×15 curve is compared to the Minbloc HC1400 curve the difference between existing nepheline powder and the new powder is apparent.

The improvement in thermicity of the film is only a few percent, but it does result in a thermicity that is on par with or less than the thermicity of films using other industrial leaders. In a test with 10% loading of the 6×17 powder of the invention, the thermicity was 19%. Minbloc HC1400 produced a film having a thermicity over 21% and Cristobalite produced a film having a thermicity of about 22%. The closest non-syenite or nepheline syenite was Polestar to produce a film having a thermicity of about 19%, but having a low transmittance as shown in FIG. 20, so it blocks energy in both directions. The invention produces a film with low thermicity with a high transmittance while giving better optical properties (See FIGS. 12 and 13) and lower or equal transition metal content. The haze for the 5×15 preferred version of the present invention is about 60 and the clarity is about 24-25. This full clarity and low haze together with the transmittance and thermicity of film using the present invention makes the present invention a uniquely different and superior filler for thermal films. It maintains the advantages of nepheline syenite type of powder. As shown in the table of FIG. 19 and in FIG. 20 an alternative version of the present invention having a distribution of 6 microns for D5 and 17 microns for D95 has equally reduced thermicity to the 5×15 preferred embodiment of the present invention. Thus, the term "about 15 microns" which was the preferred targeted maximum particle size has in practice expanded to mean a controlled maximum grain size D95 which may extend to about 17 microns. The embodiment of the invention which has a minimum grain size of 6 and a maximum grain size of 17 is produced by using the targeted values set forth in FIG. 7 with a slightly expanded "controlled" maximum grain size. This expanded targeted grain size for the 6×17 powder is not preferred over the 5×15 powder.

Figure 17:
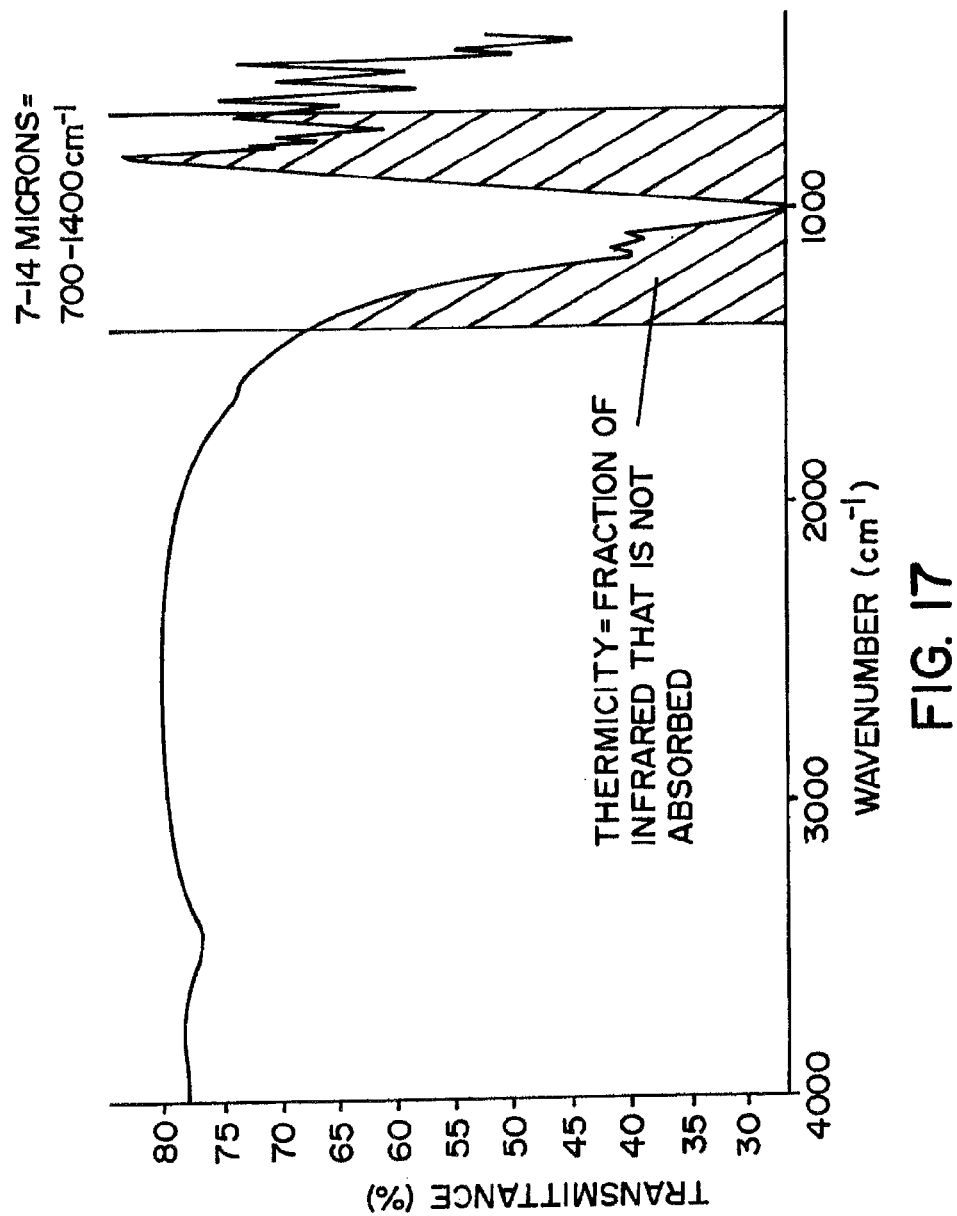
FIG. 17 is a graph showing the FTIR spectra for a film using the existing powder shown in FIG. 14 and illustrating the range of infrared wave length used in tailoring the particle size profile in the present invention.

In summary, the present invention relates to an ultra-fine nepheline syenite powder having the distribution such as generally shown in FIG. 8 and illustrated schematically as curve 5×15 in FIG. 14. This curve of the preferred embodiment in FIG. 14 is compared to the curves for the three commercial Minbloc powders shown in the distribution curve of FIG. 15. The difference of the invention is the distinction between the curve shown in FIG. 14 and FIG. 8 as compared to the nepheline syenite particle distribution "bell" curve shown in FIG. 15. The invention employs the advantages of ultra-fine nepheline syenite powder with a maximum particle or grain size of less than 20 microns, together with a controlled maximum grain size and a controlled minimum grain size. This produces a narrow range of particle size to produce consistency while obtaining the advantage of making the nepheline syenite powder ultra-fine. Furthermore, it has been found that the thermicity can be improved without affecting the transmittance of the nepheline syenite powder by tailoring the nepheline syenite powder as shown in FIGS. 8 and 14. The thermicity is a known parameter having the characteristics as shown in FIG. 16. FIG. 17 utilizes this same mathematical relationship that is illustrated with respect to a nepheline syenite powder filler such as Minbloc (HC1400). The portion of the transmittance wave form curve between 700 and 1400 wave numbers for the resin is used to determine the thermicity of the resin or film using the nepheline syenite powder and loaded to about 10% for the resin of FIG. 17. FIGS. 18 and 19 show the thermicity values of thermal films prepared with the preferred nepheline syenite powders and prior art Minbloc HC1400 powders, all having 10% loading.

Figure 3:
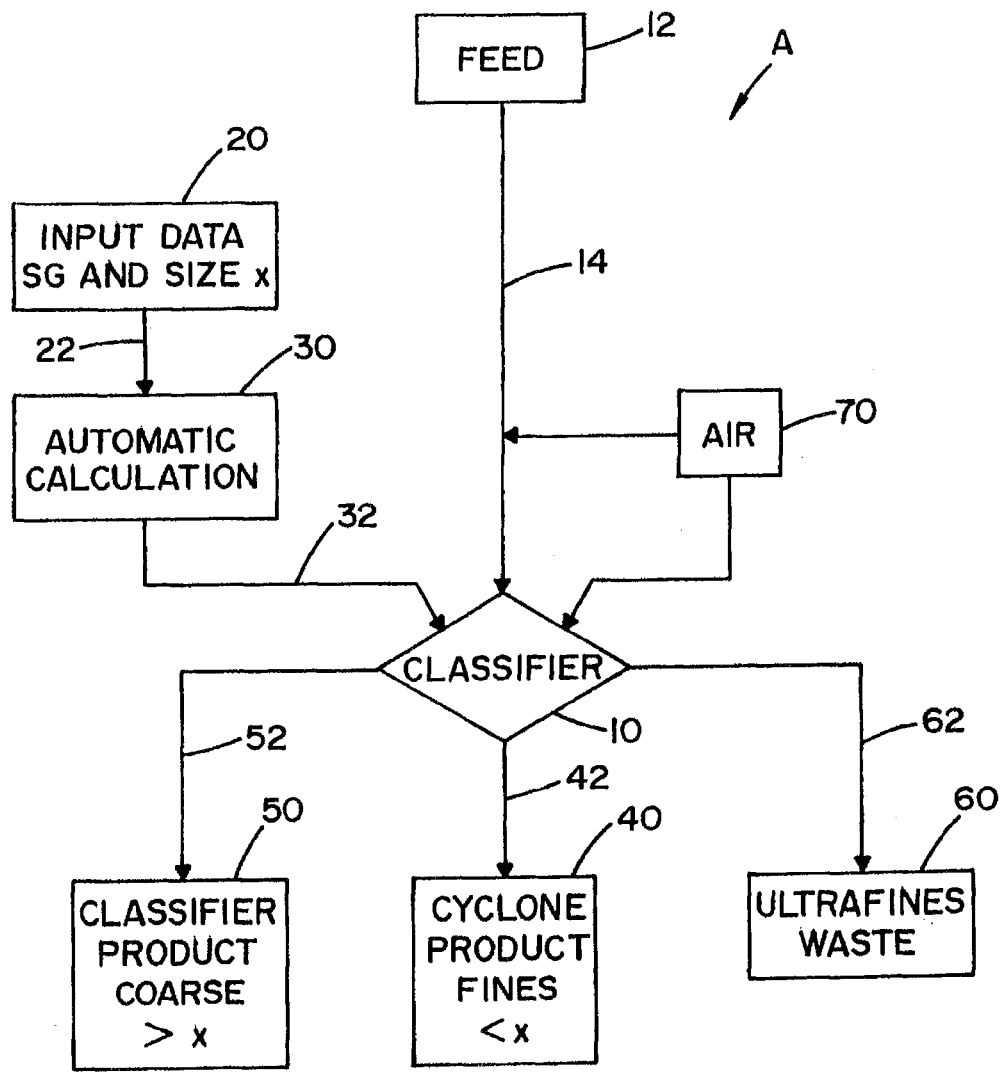
FIG. 3 is a flow chart schematically illustrating the first preferred embodiment of the method for producing the novel ultra-fine nepheline syenite powder.

The invention of the novel nepheline syenite powder indicated that the performance of the filler for the thermal films depends upon the particle size profile. The nepheline syenite powder of the present invention was classified by a Nisshin Engineering classifier Model TC-15 NS as schematically illustrated in FIG. 3. The particle size for classification is computer controlled by adjusting the rotational speed of the disk and the air flow over the disk. When setting a specific size, three fractions are corrected. The first fraction is larger than the set value and is indicated to be the classifier fraction directed by line 52 to corrector 50. The second fraction is a value smaller than the set value and is termed the cyclone fraction. This is directed to corrector 40. The waste fraction contains mostly very fine particles but also large particles that were not corrected by the classifier disk. This fraction is discarded at corrector 60. By controlling first the maximum particle size then the minimum particle size to defined values, the resulting novel powder produces a film having thermicity which is reduced. The powder has a tailored particle size profile to have all the advantages of a narrow spread between the maximum and minimum particle sizes and an improvement in the scattering of light by matching the particle size with the range of infrared radiation to be scattered. The thermal performance of the nepheline syenite of the present invention was also improved by about 10% by creating the powder with a D50 grain size of about 8-10 microns.

To test the novel nepheline syenite powder, it was compounded with a low density polyethylene resin. Ethylene vinyl acetate resin is a common thermal film to be compounded in the same manner. The loading of the novel filler powder in the resin for the test was 10%; however, the loading can be between 5 and 25 percent. The thermicity of the film was determined in the range of 7-14 microns. It was found that the performance of the nepheline syenite powder depend upon the PSD so that the particle size profile is skewed toward a smaller grain size in the general range of 7-14 microns as shown in FIG. 8. A key property of the new nepheline syenite powder is the thermicity of the resin or film using the powder. It was found that the thermicity was indeed a function of the particle size profile. The thermicity reported in FIG. 18 utilizes the D50 particle size to plot the thermicity of a film using the invention and the closest prior art. The lowest thermicity used in creating the plot of FIG. 18 was found when the D50 value of the present invention was about 8-10 microns as reported in the table of FIG. 19. To establish the advantage of the present invention a standard nepheline syenite powder Minbloc HC1400 having a profile as shown in FIGS. 14 and 15 was merely modified to remove the tail at the smaller particle size of this commercial product. This act alone, without the novel tailoring of the invention, was found to reduce the thermicity of a film using the resulting powder. Consequently, a major contributor to a reduced thermicity is the removal of small particles to "control" the minimum particle size D5 to a value in the range of 4-7 microns. All the samples of the present invention use this basic concept as not heretofore employed in making nepheline syenite powder tailored for fillers in thermal films.

Thermicity and transmittance of a film are positively correlated for most fillers not formed from nepheline syenite powder. Lower (and better) thermicity is found in films that have lower transmittance. A thermal film that passes less daylight passes less infrared light as well. However, the 5×15 preferred embodiment of the present invention produces a film having high transmittance and still very good thermicity. For instance, this preferred embodiment produces a film having higher transmittance than film using Polestar and yet has at least as low thermicity. The haze and clarity of the resin including the filler is controlled by scattering. This function does not correlate with thermicity. Furthermore, a weak negative correlation is found between the particle size D50 and clarity. Larger particles cause lower clarity. However, no correlation of the transmittance or haze with the D50 value was found during testing. Consequently some properties of a resin using the particular fillers are correlated and others are not. Optical properties are important for performance of the film having a filler. For optimum crop growth, at least 80% of the sunlight needs to go through the thermal film. This factor limits the maximum filler loading that can be used. However, transmittance and the function of loading could not be used to estimate the maximum possible loading. It has been found that the loading of the filler used in the present invention can be higher than most other fillers not formed from nepheline syenite powder. Testing and producing of the powder in accordance with the present invention has also revealed that nepheline syenite powder with a D50 value ranging from 8-10 microns is beneficial. It has also been found that if the minimum particle grain size is about 5-6 microns and the maximum particle grain size is about 15-17 microns, the optimum results are obtained. This slight increase in the targeted or controlled particle size is included in the definition of "about 15 microns". Shifting the preferred targeted maximum size slightly keeps the particle size profile in the area shown in FIG. 8 and merely skews the curves 9, 10 and 11 in FIG. 8 slightly to the right. The particle size profiles are still concentrated in the wave lengths of 7-14 microns.

The novel nepheline syenite powder having a controlled maximum grain size D95 of about 15 microns and a controlled minimum grain size D5 in the range of 4-7 microns has been produced by using a clarification method shown in FIGS. 3-6 or a milling and clarification method as described with respect to examples described in FIGS. 21-26. When the classification method is employed, it has been found that a version of the powder having a maximum grain size of about 15 microns and a minimum grain size of 5 microns with the D50 grain size of 10 microns has been produced by a multi-stage operation of the classifier shown in FIG. 3. In the first stage, a coarse cut is made with the classifier set at 13 microns. This sets the maximum grain size D95. Thereafter, the pre-processed powder from the first run or "cut" of classifier 10 is processed by the classifier again with the classifier set at 5 microns. This process was repeated three times so the resulting "controlled" minimum grain size D5 was 5.3 microns the maximum grain size D95 was 15.2 microns. The D50 particle size was 9.31 microns. This process was used for producing sample (10) set forth in FIG. 7.

The ultra-fine powder, as described, primarily utilizes a syenitic material or composition, such as nepheline syenite; however, it has been found that the advantages of the invention, as defined herein, are obtainable by using natural occurring mineral or rock materials having a hardness above 5 on the Mohs scale or naturally occurring mineral or rock material with a refractive index in the range of 1.4 to 1.6 and, indeed, preferably 1.46 to 1.56. The invention using either of these two types of material is still ultimately an ultra-fine powder having a controlled or "engineered" particle size distribution in the defined range to reduce the thermicity of a thermal film using the ultra-fine powder to a value less than about 20%. When the invention is practiced by utilizing one of several defined hard mineral or rock materials, the novel powder is produced as long as the powder has the defined engineered particle size distribution. As is known, a hard material is defined as a Mohs hardness of 5 or higher. Feldspar has a Mohs number of about 6 and quartz has a Mohs number of about 7. Various naturally occurring materials having the correct controlled, engineered particle size distribution will produce a low thermicity, when used in the thermal film and will have the other advantages mentioned above when used in other applications.

As indicated above, the naturally occurring material forming the feedstock to produce the ultra-fine powder of the present invention can be selected according the Mohs number or its refractive index, so long as the novel controlled PSD is imparted to the powder made from the material. Powder made from hard material has other applications besides thermal film. Material selected by its refractive index is material particularly useful for thermal film and clear coatings. The invention is not limited to a selected type of material, although the particular, defined types of materials are further definitions of the invention. The types of materials are aspects of the invention, as defined in the appended claims and disclosed in the statements of invention and the objects of the disclosed invention.

When the feedstock material is selected by its Mohs number, it has been determined that such material can be selected from the class comprising nepheline syenite, feldspar, silica, quartz, cristobalite and tridymite. However, when the feedstock material is selected based upon the range of the refractive index, it has been determined that such material can be selected from the class comprising silica (including ground natural and diatomaceous), cristobalite, feldspar, quartz, nepheline syenite, kaolin, alumina triydrate, talc, attapulgite, pyrophyllite, calcium hydroxide, magnesium hydroxide and hydrotalcite. The starting materials are preferably selected from the class consisting of silica (including ground natural, diatomaceous) cristobalite, feldspar, quartz, nepheline syenite, kaolin, talc, attapulgite and pyrophyllite. These materials have been processed as described herein.

In addition, research and development work in producing and perfecting powder with the controlled particle size distribution has resulted in development of novel manufacturing methods for some of the feedstock materials. Thus, methods of producing the ultra-fine powder are defined by the several appended claims of this application. These appended claims constitute a part of the disclosure of the invention.

Classification Method

FIGS. 3-11

To produce the narrowly sized nepheline syenite powder of the present invention, the first preferred type of production method involves the use of air classifiers to control the minimum grain size of the nepheline syenite powder. Control of the minimum particle size is a new concept in the nepheline syenite powder art of the nepheline syenite industry. The initial research and development project resulted in method A using a Nissin Engineering Turbo Classifier Model TC-15-N-S as shown in FIG. 3. It was discovered that this air classifier operated in a unique manner could produce the desired nepheline syenite powders constituting the inventive aspect of the present invention. Classifier 10 is equipped with a microprocessor that calculates operating conditions based upon the minerals specific gravity and the cut off point "x" for producing one extreme of the desired ultra-fine nepheline syenite powder. Method A disclosed in FIG. 3 utilizes the Turbo Classifier 10 in which a feedstock comprising a preprocessed nepheline syenite powder or a powder from a prior run of the classifier is introduced as indicated by feedstock supply or block 12. In the preferred embodiment, pre-processed nepheline syenite powder is introduced into classifier 10 as indicated by line 14. In practice, the initial feedstock from supply 12 through line 14 is a powder made from nepheline syenite or another naturally occurring rock or mineral without a significant amount of free silica. The feedstock has a controlled maximum particle size or grain size greater than 20 microns and preferably in the range of 20-150 microns. This pre-processed nepheline syenite powder with a controlled maximum grain size is introduced into classifier 10 for a purpose of producing various nepheline syenite powder with a first run having targeted maximum particle size D95 distribution and then a subsequent run where "x" is the targeted minimum particle size D5. This procedure produces samples (9)-(11), as shown in the first column of FIG. 7. Each of these novel ultra-fine nepheline syenite powder samples made in accordance with the present invention have a minimum particle size D5 in the range of 4-7. The minimum particle size is controlled by classifier 10 as removed from collector 40 as well as a maximum grain size produced in a prior run and removed from collector 50. This intermediate powder produced by a first run through classifier 10 is used for the minimum size run.

Method A using classifier 10 includes a data input block 20 where an operator inserts the specific gravity of the nepheline syenite powder. The maximum size D95 and then the minimum size D5 are selectively entered as set value "x." Data from block 20 is directed through line 22 to a microprocessor stage 30. Microprocessor stage 30 sets the classifier air flow and the rotor speed of the classifier. Selected information is provided to the classifier through line 32 to operate classifier 10 for controlling first the upper and then the lower grain size of the final powder. During the first run the cyclone section of classifier 10 separated particles greater than the desired particle size value x as set by microprocessor 30. This intermediate powder is deposited into collector or block 40 through line 42. The intermediate powder with a controlled maximum particle size is removed from collector 40 and introduced into supply 12 for reprocessing by classifier 10 with set particle size "x" at the targeted minimum particle size D5. In this procedure the final novel ultra-fine nepheline syenite powder is deposited into collector or block 50 by line 52. This second operation may require more than a single pass through the classifier and the particle size value "x" may be progressively reduced. Small fines are discharged from classifier 10 into block 60 through line 62.

Classifier 10 employs a classifier disk in accordance with standard technology and a cyclone to process the feedstock entering the classifier through line 14. See English U.S. Pat. No. 4,885,832 for a representative description of this known technology. Microprocessor 30 controls the air for dispersion and for the classifier as indicated by block 70. Thus, microprocessor 30 is set for a determined particle size "x" which size is controlled by the rotating rotor disk and the cyclone of the classifier. Consequently, in practice nepheline syenite feedstock is classified by the Turbo Classifier 10 using a combination of the classifier disk and cyclone. The particle size D95 or D5 is computer controlled by adjusting the rotational speed of the disk and the air flow over the disk. When setting a specific size, D99 or D5, three factions are collected. The faction less than the set value "x" which is directed to collector or block 40. The large faction greater than the set value, is separated by the disk of the Turbo Classifier 10 and deposited "x" into collector 50. The waste faction is directed to block 60 and contains mostly very fine particles but also large particles that were not collected by the classifier disk. This waste material is discarded.

Classifier 10 is set by an operator by the data input at stage or block 20 to control the classifier disk and the cyclone air so that the set particle size "x" is separated as indicated by either block 40, 50. If the classifier is set to the desired targeted minimum particle size D5, the powder is collected at block 50. If the collected powder is to have a maximum grain size or particle size, it is either previously or subsequently passed through the classifier again and the data entered at block 20 is the maximum grain size. The powder is collected from block 40. Thus, by both a lower cut and upper cut of particle size by classifier 10, the novel ultra-fine nepheline syenite powder is produced. Samples of the novel powder are defined by the values in FIG. 7 with the PSD curves shown in FIG. 8. The novel powder for thermal films is "ultra-fine" nepheline syenite powder which defines a powder having a maximum grain size less than about 20 microns. The substantial advantages of "ultra-fine" nepheline syenite powder have been recently discovered and are known in the art, especially when the ultra-fine nepheline syenite powder is used as a filler in coatings or, especially thermal films.

Figure 9:
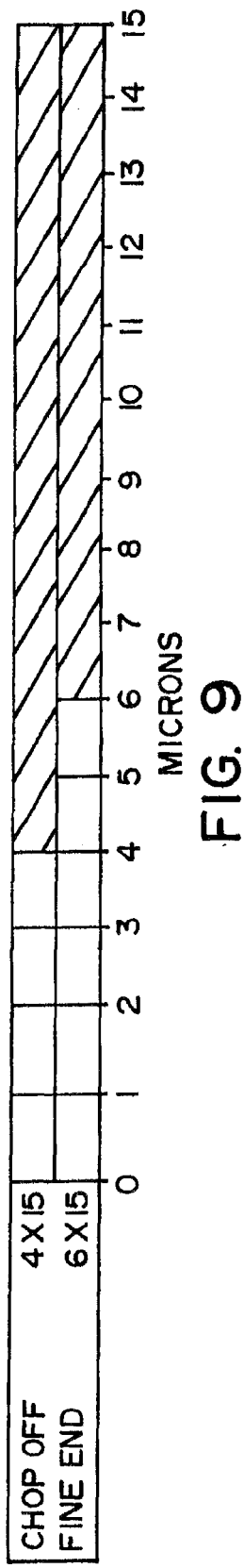
FIG. 9 is a schematic graph illustrating samples of the present invention produced by a method where the novel nepheline syenite powder is formed by merely removing the tail end of the nepheline syenite powder feedstock.

Operation of method A as described is used to produce ultra-fine nepheline syenite powder with various targeted sizes as set forth in the samples (9)-(11) of FIGS. 7 and 8. The targeted sizes have resulted in the actual particle size distributions recorded in table of FIG. 7. Method A is the first preferred embodiment of a type of process discovered to be useful in practicing the present invention, which invention relates to an ultra-fine nepheline syenite powder for thermal films and having a controlled minimum particle size D5 of 5-7 microns. The novel powder has a controlled maximum particle size D95 of about 15. The actual particle size distribution for targeted samples (5)-(11) described in FIG. 7, is shown in the particle size curve of FIGS. 8 and 11. The powder can be made by only removing the smaller particles using a feedstock with a D95 particle size of about 15 microns as shown in FIG. 9 or by "control" of both the D95 and D5 particle size as in FIG. 10.

These preferred implementations of the present invention, samples (9)-(11) have a controlled maximum particle size of 15 microns and have the actual grain size distribution as shown in the table of FIG. 7 and in the curves of FIGS. 8 and 11. The general range of particle sizes are shown in FIGS. 9 and 10 where the minimum size is D5 and the maximum size is D95. The feedstock or intermediate powder has a D95 particle size in the powder of FIG. 9. The novel concept is controlling the lower grain size of the nepheline syenite powder to a minimum size of 4-7 microns, combined with controlling the maximum particle size of the nepheline syenite powder to a size D95 of about 15 microns as in samples (9)-(11). These samples have the targeted particle sizes and the actual particle size distribution provided in FIG. 7 and illustrated in the particle size distribution curves of FIGS. 8 and 11. The same particle sizes are shown as the powder sizes in FIGS. 9 and 10.

In summary, method A schematically illustrated in FIG. 3 has been developed to produce the novel ultra-fine nepheline syenite powder of the present invention wherein the minimum particle size is controlled to create an ultra-fine nepheline syenite powder with a maximum particle size D95 of about 15 microns with a controlled minimum particle size D5 of 4-7 microns.

Figure 4:
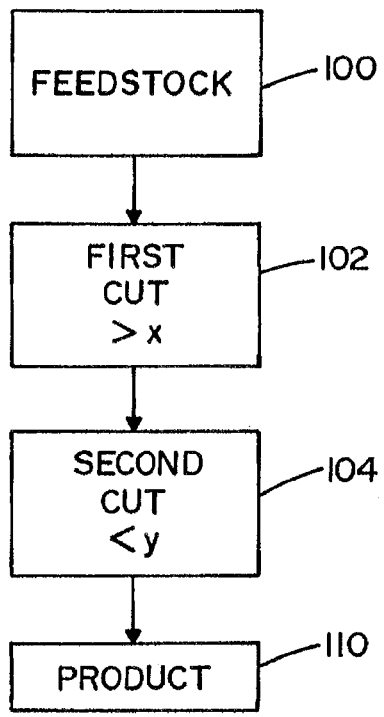
FIG. 4 is a block diagram of a method of producing the novel nepheline syenite powder.
Figure 5:
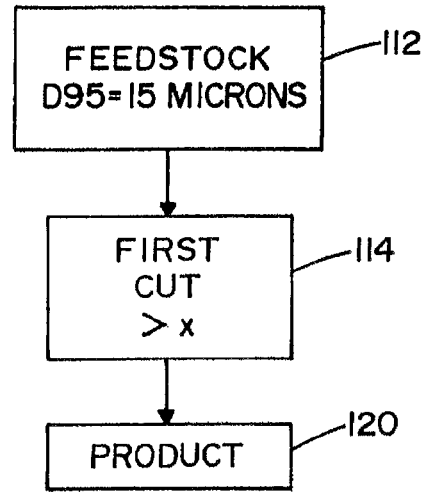
FIG. 5 is a block diagram of the method of producing one version of the ultra-fine nepheline syenite powder of the present invention where the feedstock has the desired controlled maximum particle size.
Figure 6:
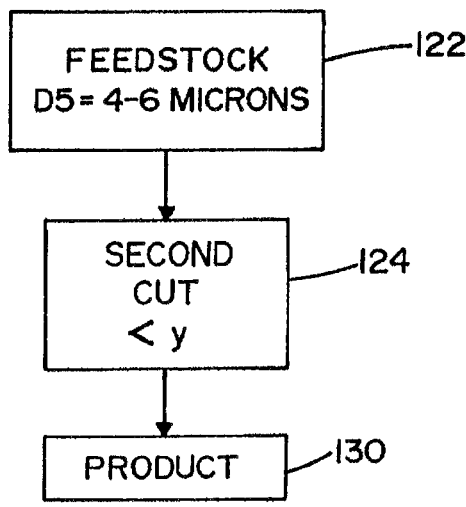
FIG. 6 is a block diagram schematically illustrating a method of producing a version of the ultra-fine nepheline syenite powder.

Method A can be operated to produce the novel ultra-fine nepheline syenite powder by performing the steps set forth in FIGS. 4 and 5. Method A, as shown in FIG. 3, is used to produce samples (9)-(11) as disclosed in FIGS. 8 and 11. This method makes the powder described in FIG. 10. As shown in FIG. 4, nepheline syenite powder having a maximum particle or grain size greater than about 30 or 40 microns is introduced as the feedstock in hopper 12 as indicated by block 100. Since this material has a relatively large controlled maximum grain size, it is first passed through classifier 10 as indicated by block 102 to control the minimum particle size, represented as x, i.e. 4-7 microns. Thereafter, it is passed through classifier 10 to control the maximum grain size y, as indicated by block 104. This procedure makes a powder as indicated by block 110. The two classifying stages are normally reversed. The product has a minimum particle size x of 4-7 microns and a maximum particle size y of about 15 microns. A feedstock with a maximum particle size D95 of about 15 microns can be the starting material as shown in block 112 in FIG. 5. The feedstock has the desired maximum particle size D95 and is merely passed through the classifier set to remove the smaller particles. The minimum D5 particle size x is established, as indicated by block 114 of FIG. 5. This procedure produces at collector 120 samples described in connection with FIG. 9. The maximum grain size D5 is controlled by the inherent maximum particle size D95 of incoming feedstock. The feedstock itself has the desired controlled maximum particle size of about 15 microns. Turning now to the alternative method disclosed in FIG. 6, classifier 10 is used to produce an ultra-fine nepheline syenite powder by merely removing the particle sizes above a given value y from feedstock 122 as indicated by block 124. Such powder at collector 130 results in creation of an ultra-fine nepheline syenite powder with a controlled minimum particle size which is a requirement of the present invention by using a feedstock already processed to give a minimum grain size of 4-7 microns. FIGS. 4-6 are disclosed since they represent various operations of method A by the system shown in FIG. 3 to make the novel ultra-fine nepheline syenite powder.

Figure 12:
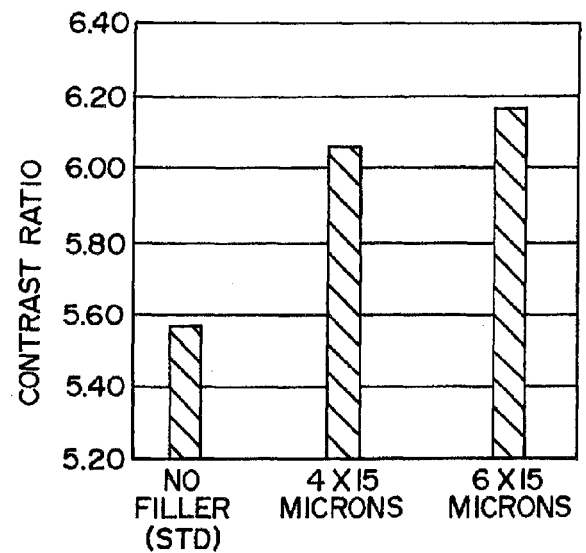
FIG. 12 is a graph of the average contrast ratio of black and white test panels having coatings with powder fillers made from two preferred embodiments of the present invention.
Figure 13:
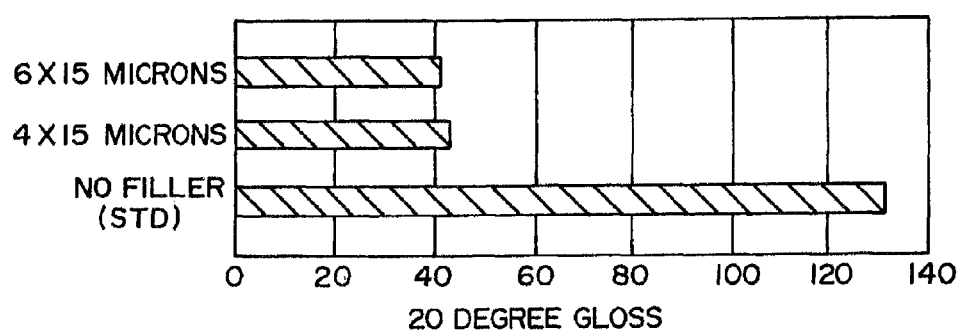
FIG. 13 is a graph of 20° gloss of powder coatings with fillers made from two preferred embodiments of the present invention.

To show properties of the invention, the nepheline syenite powder disclosed in FIGS. 7 and 10 was formulated in a clear acrylic powder coating. This is to determine the effect of the particle size of the inventive powder or clarity in gloss. In terms of gloss reduction and clarity the powder with a minimum particle size of 4 and a maximum particle size of 15 (4×15) or a minimum size D5 of 6 and a maximum size D95 of 15 (6×15) performed the best and represent a new and novel way to reduce the gloss while maintaining good clarity. Two powders having the novel features of the present invention were tested. The two samples were 4×15 and 6×15 powder. In the test procedure, coatings with various fillers were sprayed onto cold rolled steel. Steel panels with a coating having a target final thickness of 1.5-2.0 mils were produced. The panels with the coatings were baked at 204° C. each for ten minutes. The contrast ratio was determined by using black and white panels that were coated and measured with a Macbth Coloreye 3000. The contrast ratio is indication of the difference in the respective measurement over black and white. This measurement was used as an indicator of the haze. The two new and novel nepheline syenite powders were tested in a clear powder coating. The powders gave excellent results for both clarity and gloss. Lower gloss is a benefit because they usually have to use additives, such as waxes to decrease the gloss. This is an important development because maintaining clarity while lowering gloss is a significant objective. The results of these tests are shown in FIGS. 12 and 13. In summary, the novel nepheline syenite powder maintains excellent clarity while gloss was reduced by as much as 50% from the unfilled system. Thus, ultra-fine nepheline syenite powder with a controlled minimum particle or grain size D5 of 4-7 microns maintains clarity while lowering gloss. These tests merely illustrate the additional properties of the powders invented for specific application in thermal films.

Milling and Classifying Methods

FIGS. 21-27

As discussed previously, a preferred method of producing such novel powder involves the use of an opposed air jet mill followed by a classifier or an attrition mill operated in a dry mode followed by an air classifier. The dry mill grinds the incoming nepheline syenite powder feedstock into a powder having reduction in the maximum particle size. This is the normal operation of a mill; however, in accordance invention, the mill for reducing the maximum grain size is used to produce a powder where the maximum grain size D95 is about 15 microns. Consequently, the resulting dual processed nepheline syenite powder is "ultra-fine". This subsequently milled pre-processed powder feedstock is converted into an intermediate powder with this controlled maximum particle size. Then the intermediate powder is passed through an air classifier to obtain the targeted minimum particle size D5 at a controlled value in the range of 4-7 microns. The resulting powder is new and is an ultra-fine nepheline syenite with both a controlled maximum particle size D95 of about 15 microns and a controlled minimum particle size D5 at a value in the range of 4-7 microns. This dual process creates a powder having the advantageous improved characteristic of the new powder, especially to reduce and control the thermicity of a film using the ultra-fine nepheline syenite powder. Of the many technologies investigated to produce the new nepheline syenite powder, the first preferred implementation was the classifying method A disclosed in FIG. 3. It has been found that the preferred commercial embodiment of the invention involves the use of a mill to dry grind nepheline syenite powder feedstock having a controlled grain size substantially greater than 20 microns and less than about 150 microns. In practice the pre-processed powder has a D99 particle size of about 100 microns and a D50 particle size of about 15 microns.

Figure 21:
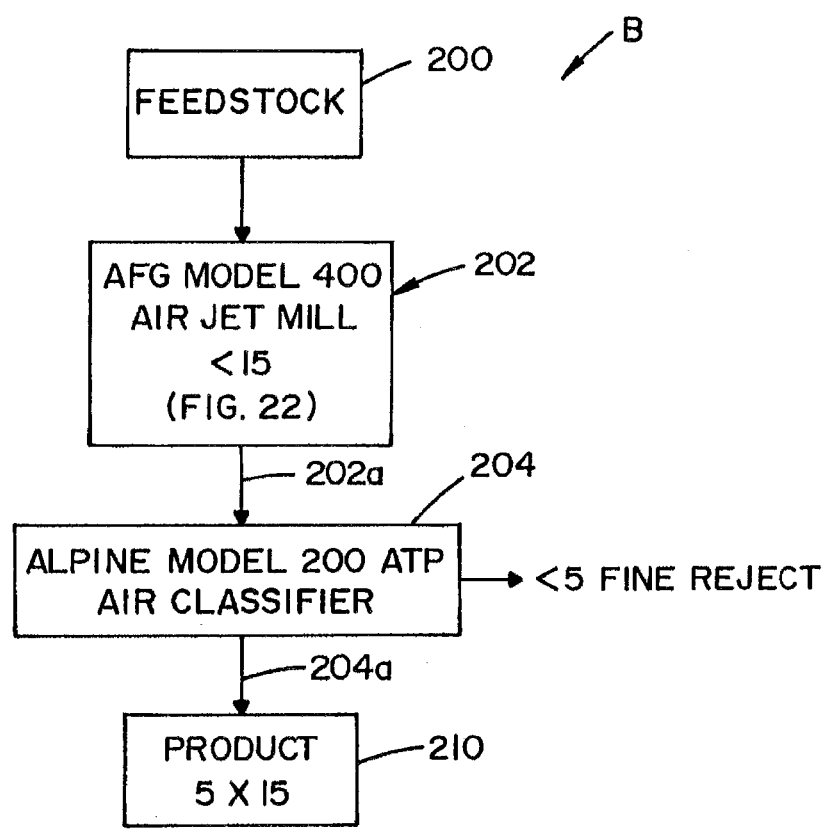
FIG. 21 is a block diagram of a second preferred embodiment of an inventive method for producing ultra-fine nepheline syenite powder having the characteristics of the novel powder of the present invention.

This second preferred embodiment of the present invention is method B disclosed in FIG. 21. Method B involves use of pre-processed nepheline syenite feedstock having a controlled maximum particle size of about 60 microns, as disclosed in the graph of FIG. 24A and table of FIG. 24B. The maximum particle size D99 of this feedstock is about 60 microns to produce the controlled particle size of the nepheline syenite powder. In a practical implementation of method B, the feedstock is merely processed nepheline syenite having a particle size D95 or D99 over about 20-150 microns.

Method B involves the use of an opposed air jet mill from Hosokawa Alpine and sold as AFG Model 400. This opposed air jet mill 202 is the second preferred mill used in practicing the invention and is illustrated as the mill for method B shown in FIG. 21. Such mill is schematically illustrated in Zampini U.S. Pat. No. 5,423,490 and Konetzka U.S. Pat. No. 6,543,710, which are incorporated by reference herein. This fluidized bed opposed jet mill use air jet mill for grinding the feedstock. As compressed air exits internal nozzles, it is accelerated to extremely high speeds. In expanding, the energy contained in the compressed gas is converted to kinetic energy. The velocity of the air exiting the Laval nozzle or nozzles exceeds the speed of sound. The air is the grinding gas. Gas and powder from the fluidized bed is comminuted as the result of interparticle collision of the air jets, especially in the areas where opposed jets intersect. The fluidized bed opposed jet mill has a dynamic deflector-wheel classifier so the fineness of the particles is a function of the wheel speed. See Zampini U.S. Pat. No. 5,423,490 for a jet nozzle design. The feedstock from feed input or supply 200 is ground by mill 202 set to the targeted maximum particle size which in the illustrated embodiment is about 15 microns. This opposed jet mill is disclosed in FIG. 22 and directs ground nepheline syenite powder through line 202a to an air classifier 204, which classifier, in the preferred embodiment, is an Alpine Model 200 ATP. Feedstock enters the classifier as the classifier air flows through the rotating classifying wheel. This wheel extracts fines and conveys them by air from the classifier. The coarse material is rejected by the classifying wheel and exits the lower discharge valve for the powder that has a controlled minimum particle size. This air classifier is set to remove particles having a size less than the targeted minimum particle size D5 in the range of 4-7 microns. Product passing through lines 204a is collected as indicated by block or collector 210. Method B was developed for producing the novel ultra-fine nepheline syenite powders identified as samples (9)-(11) illustrated in FIG. 7 and the samples (12)-(13) illustrated in FIG. 10. In the representative use of method B illustrated in FIG. 21, 5×15 sample (10) is produced. However, method B is also applicable for the other examples mentioned and, indeed, to produce the other samples of the present invention as set forth in FIGS. 7 and 10.

An opposed air jet mill performs the dry grinding function of block 202 in FIG. 21. This device is schematically illustrated as opposed air jet 220 in FIG. 22. Mill 220 accepts pre-processed nepheline syenite feedstock from block or supply 200 and directing the feedstock into hopper 222. The feedstock has a maximum particle size previously imparted to the processed feedstock powder. This maximum particle size is in the general range of 20-150 microns. The processed feedstock enters mill 220 through feed hopper or funnel 222 and is then conveyed into the mill by the compressed air or gas inlet 224 from a supply of compressed air or gas 226. To grind the incoming feedstock compressed grinding air is introduced into the mill through inlet 230 connected to a compressed grinding air source 232. In accordance with this type of commercially available grinding mill, as already explained, there is a grinding chamber 240 where the feedstock is subject to high speed air jets. The chamber has a replaceable liner 242 and a grinding air manifold or recirculating air chamber 244. Ground particles having a reduced grain size from the feedstock are directed to outlet 260 surrounded by a vortex finder 262. The ground particles P are drastically reduced in size from the incoming feedstock FS. The commutation or grinding is performed by the opposed air jets in chamber 240. In one use of mill 220, the particles exiting from outlet 260 has the desired maximum particle size, i.e. the targeted D95 size. In another use of mill 220, there is a classifier set at the maximum particle size and the ground powder from outlet 260 is larger, but is subsequently classified to the desired maximum particle size, which is D95 equals about 15 microns or, indeed, targeted at 15 microns. In the equipment used in method B, mill 220 has a variable speed internal classifier wheel which is adjusted to separate particle sizes less than a desired target size. The separated particles exit by gravity through line 202a into a collector 202b. Particles in line 202a shown in the illustrated embodiment of the invention have a maximum grain size of 15 microns. Particles having larger particle size, but entering into the classifier 270 from outlet 260 are directed through line 272 back into the grinding chamber with incoming feedstock FS at funnel or hopper 222. Powder from the classifier wheel enter line 202a and is deposited in collector 202b. The powder has a controlled maximum particle size. It is then bagged and introduced into air classifier 204, as indicated by dashed line 202c. The opposed air jet mill is the preferred dry mill used in practicing method B as shown in FIG. 21. An example of a run using method B will be described in detail with respect to FIGS. 24-27.

Figure 22:
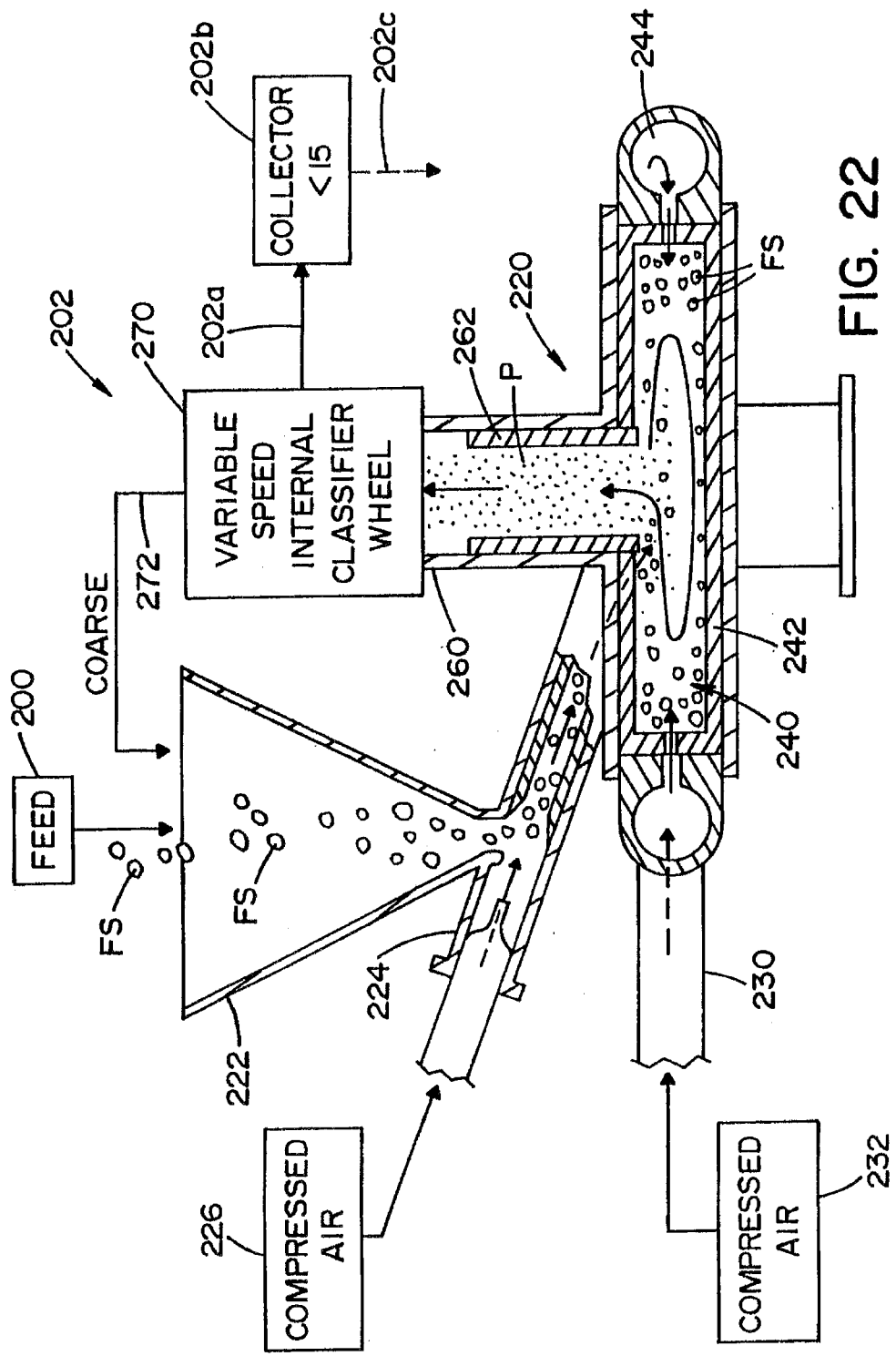
FIG. 22 is a schematic diagram of an opposed air jet mill of the type used in practicing the method described in FIG. 21.
Figure 23:
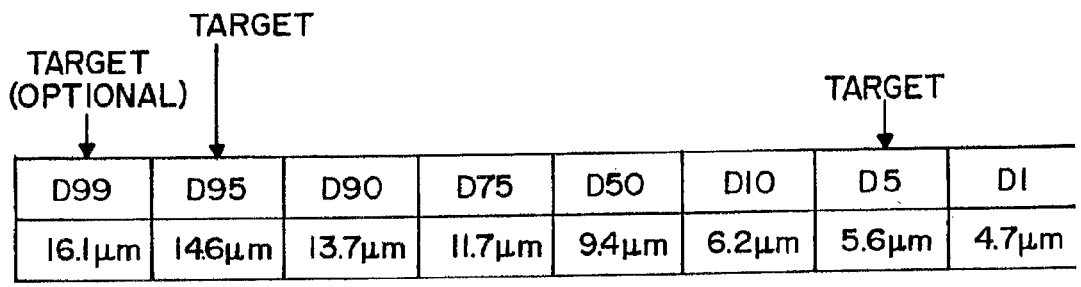
FIG. 23 is a Table of particle size analysis for an ultra-fine nepheline syenite powder targeted as a 5×15 powder showing maximum and minimum particle sizes.

Before a description of an implementation of method B shown in FIG. 21, a generic version of this method will be explained. A processed feedstock with a large maximum particle size is directed into a "dry" mill. This mill can be an attrition vertical stirred dry mill in a closed circuit or, preferably, an opposed air jet mill as used in the second preferred embodiment of the invention as shown in FIG. 22. Thus, the generic version of method B employs a dry mill that produces a powder having a maximum particle size D95 matching a selected maximum targeted particle size of 15 microns. The dry mill is normally combined with an air classifier and has a coarse powder return to recirculate the powder as it is being ground to the targeted maximum size. The output of the dry mill and/or air classifier is the intermediate powder. This intermediate powder is directed to an external air classifier that removes particle sizes less than the targeted minimum particle size D5, which is in the range of 4-7 microns. The preferred targeted size D5 is 5 microns. From the external, second stage air classifier, the desired ultra-fine nepheline syenite powder is directed into a collector. The product in the preferred embodiment is identified as a 5×15 powder having a targeted maximum particle size D95 of 15 microns and a targeted minimum particle size D5 of 5 microns. The first and second preferred methods developed for producing this novel ultra-fine nepheline syenite powder are the types of process disclosed as methods A and B. Method B has herein been generically disclosed to show the breadth of method used to produce the novel nepheline syenite powder. Both methods are used to produce the preferred samples of the novel ultra-fine nepheline syenite powder (4×15, 5×15 and 6×15) is set forth in the curves of FIGS. 8 and 11 and constituting samples (9)-(11) respectively of FIG. 7 or the 6×17 version of the method as shown in FIG. 20.

Representative Run

FIGS. 23-27

Figure 24:
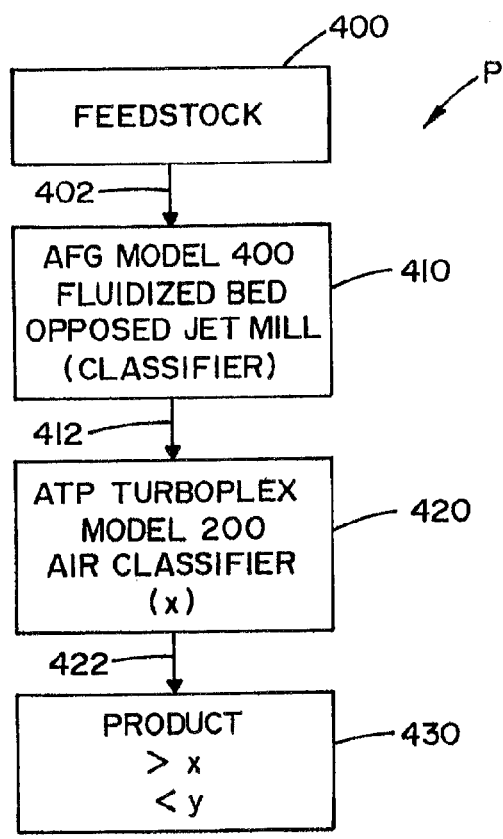
FIG. 24 is a block diagram schematically illustrating the second preferred embodiment of practicing the present invention like the embodiment of FIG. 21 and the practical alternative to the embodiments of the first preferred method, as described in FIGS. 3-6.
Figures 24A, 24B:
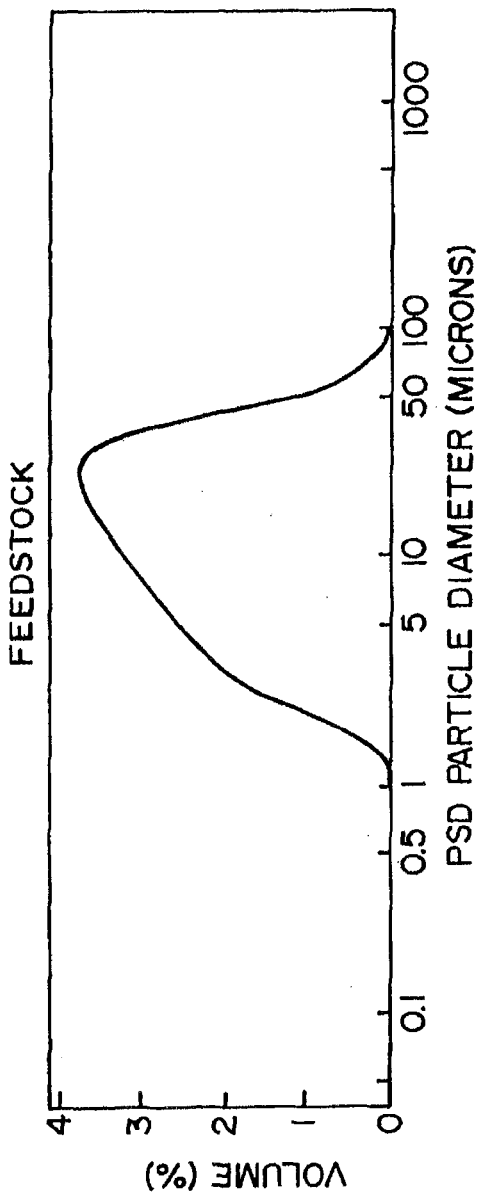
FIG. 24A is a particle size distribution curve for a feedstock used in the second preferred embodiment as illustrated in FIG. 24.
FIG. 24B is a table representing the particle size distribution data set forth in the graph of FIG. 24A.

During the development of the novel concept of controlling the minimum particle size D5 of an ultra-fine nepheline syenite powder to a value in the range of 4-7 microns and maximum particle size D95 of about 15 microns, several novel methods were developed and have been described. The preferred commercial implementation of the invention realizes method B disclosed in FIG. 21. A representative test run of this method was used to produce a nepheline syenite powder having a targeted maximum particle size D95 of 15 microns and a targeted minimum particle size D5 of 5 microns. The profile of the desired particle size distribution of the resulting powder is recorded in the table of FIG. 23. Method P illustrated in FIG. 24 was used in the representative run to produce an ultra-fine nepheline syenite powder having a controlled minimum particle size of 5 microns and a controlled maximum particle size of 15 microns. The feedstock was a pre-processed nepheline syenite powder having a controlled maximum grain size of 60-100 microns as shown in FIGS. 24A and 24B; however, it could be other pre-processed nepheline syenite powder. This feedstock had no controlled minimum particle size. The particle size distribution of the feedstock from supply 400 of method P is shown in the graph of FIG. 24A and disclosed in the table of FIG. 24B. This pre-processed feedstock is directed through line 402 to an AFG Model 400 fluidized bed opposed jet mill having an internal classifier, as indicated by block 410. Powder from the jet mill is directed through line 412 to an Alpine Turboplex ATP Model 200 air classifier 420. From the air classifier the desired product is conveyed through line 422 and deposited in collector 430. In this representative run of method P using the equipment set forth in FIG. 24, the targeted minimum particle size D5 was x microns, which is the setting of the air classifier 420. The controlled maximum particle size D95 is y microns, which is the outcome of the jet mill 410 of method P. In the run, x equaled 5 microns and y equaled 15 microns. The Alpine AFG Model 400 jet mill with an internal classifier produced nepheline syenite with a particle size of less than 15 microns. Subsequently, particles with a size less than 5 microns are removed by the Turboplex air classifier 420. The feedstock was manually charged into a K-Tron volumetric screw feeder, which conveyed the feedstock through the double flat valves to the grind chamber of the mill shown in FIG. 22. Grinding was performed by three opposed jet nozzles located on the sides of the grind chamber. The three opposed jet nozzles accelerated particles using compressed air (variable pressure) to a focal point. A vertical flow of air transported the ground particles in a stream to the variable speed internal classifier wheel also disclosed in FIG. 22. Coarse or unground particles were rejected by the classifier wheel and returned to the fluidized bed for continued grinding. Particles small enough to be accepted by the classifier were air conveyed to collector 202b shown in FIG. 22. These particles were discharged from the dust collector by way of double flat valves. The particle size and capacity of the test run were controlled by varying the grinding air pressure, novel size bed height and classifier speed using the parameters set forth in FIG. 25. The intermediate powder in line 412 was directed to the air classifier 420 by manually charging the material into the hopper of a K-Tron. The feeder conveyed this intermediate powder through a rotary air lock directly into the feed inlet air flow line. From the air flow line the intermediate powder from the model 400 AFG jet mill was conveyed into the classification chamber of classifier 420. As the intermediate material or powder approached the classifier, a secondary rising air flow dispersed the material to enhance the effect of the classifier. The small fines, being lighter, floated upward to the classification wheel. The coarse material or powder was discharged into collection drum or collector 430. Particles small enough to pass through the variable speed classifying wheel were discarded. The particle size distribution (PSD) was determined using laser defraction (Beckman-Coulter LS 230), using Isopropyl Alcohol as the representative test run reduced the pre-processed nepheline syenite powder feedstock into a −15 micron intermediate material or powder for subsequent air classification by classifier 420. The parameters and results of the classifier stage of the test run are disclosed in FIGS. 25-27.

Figures 25A, 25B:
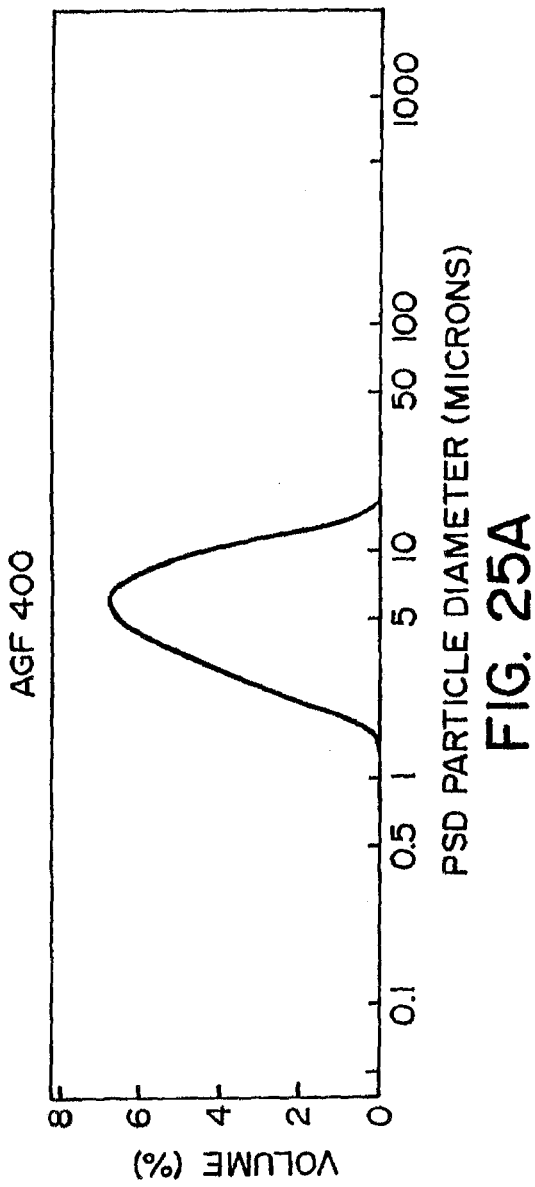
FIG. 25A is a particle size distribution curve for the output of the mill and classifier used in practicing the second preferred embodiment of the method described in FIG. 24.
FIG. 25B is a table of the particle size distribution curve as shown in FIG. 25A of the product having its maximum grain size controlled to a target size of 15 microns.
Figures 26A, 26B:
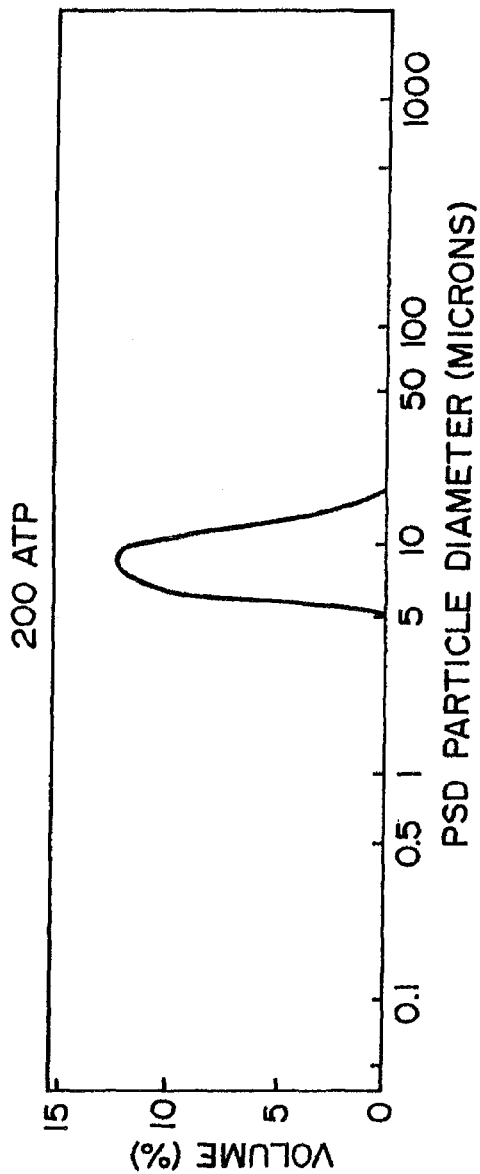
FIG. 26A is a particle size distribution curve of the product issuing from the air classifier stage of the method disclosed in FIG. 24 with the minimum grain size reduced to the targeted level of 5 microns.
FIG. 26B is a table of the particle size distribution curve set forth in FIG. 26A to define the product as produced by the second preferred method as described in FIG. 24.

In the representative test run, the parameters of the model 400 AFG jet mill 410 with a feed rate of about 240 lbs/hr are tabulated with the particle size distribution also listed in the table 410a of FIG. 25. This operation provided an intermediate nepheline syenite powder in line 412 having the particle size or distribution shown in the graph of FIG. 25A and the table of FIG. 25B. This intermediate material processed by the mill and internal classifier using parameters listed in the table 410a of FIG. 25 was directed into the air classifier, which classifier was set to parameters tabulated in the table of FIG. 26. Operating under these parameters, the 200 ATP air classifier 420 produced the powder recorded in the table 420a of FIG. 26 and having the particle size distribution shown in the curve or graph shown in FIG. 26A and in the table of FIG. 26B. This final product in the representative test run had a controlled maximum particle size D99 of 14.15 microns with 98.7% of the powder having a particle size less than 15 microns. The invention involves the control of the minimum particle size which is illustrated as being 5.78 microns for D4 and with about 0.5% of the particles having a particle size less than 5 microns. This representative test run produced the novel ultra-fine nepheline syenite powder with a controlled minimum particle size of about 5 microns and a controlled maximum particle size of about 15 microns and having the product specifications of FIG. 27.

The representative test run set forth in the drawings of this application related to use of method P; however, research and development is being conducted on using serial air classifiers especially of the Alpine model 200 ATP. They have proven successful in controlling the minimum particle size of the ultra-fine nepheline syenite powder. Such control of the minimum particle size is unique in the nepheline syenite powder art. Irrespective of the novelty of the new powder, there is a substantial technological advance in the development and use of the method of FIGS. 21 and 24. The methods are inventions in themselves in that they have been combined and used for controlling the minimum particle size and additionally the maximum particle size of nepheline syenite powder in a manner not known in the nepheline syenite powder art.

Size distributions of the products obtained are shown in Table 5. Samples 5 and 6 exhibited a significantly "tighter" or narrower distribution than the other samples. Tappi brightness, L*, a*, b* color values, and BET surface area values are shown in Table 6.

TABLE 4

Particle Size Analyses of Processed Nepheline Syenite

| Sample | Grind | $D_{99.99}$ | $D_{97}$ | $D_{95}$ | $D_{90}$ | $D_{75}$ | $D_{50}$ | $D_{25}$ | $D_1$ | Mean |
|---|---|---|---|---|---|---|---|---|---|---|
| 1 | Vibro (−5 μm) | 26.29 | 16.48 | 14.30 | 10.29 | 4.90 | 2.32 | 1.05 | 0.42 | 3.93 |
| 2 | Vibro (−15 μm) | 61.63 | 22.72 | 18.36 | 13.22 | 6.04 | 2.34 | 0.87 | 0.37 | 5.14 |
| 3 | Jet (−5 μm) | 5.53 | 4.06 | 3.83 | 3.49 | 2.92 | 2.29 | 1.71 | 1.10 | 2.27 |
| 4 | Jet (−15 μm) | 11.60 | 8.30 | 7.82 | 7.00 | 5.55 | 4.09 | 2.98 | 2.31 | 4.40 |
| 5 | VSB-M (−5 μm) | 2.64 | 1.81 | 1.66 | 1.43 | 0.93 | 0.52 | 0.34 | 0.26 | 0.69 |
| 6 | VSB-M (−15 μm) | 11.49 | 6.43 | 5.09 | 3.40 | 1.99 | 1.13 | 0.53 | 0.32 | 1.60 |

Other Devices for Making 5×15 Powder

In the initial production of the powder with a D95 size of about 15 microns and a D5 size of 5 microns, several viable procedure were discovered to produce the 5×15 powder. To make this conclusion, bulk samples of preprocessed nepheline syenite were subjected to three different types of commercial ultra-fine grinding mills. These mills and vendors are listed below.

1. VibroKinetic Ball Mill (MicroGrinding Systems, Inc., Little Rock, Ark.)
2. Fluid Bed Opposed Flow Jet Mill (Hosokawa-Alpine Micron Powder Systems, Summit, N.J.). See Konetzka U.S. Pat. No. 6,543,710 which is incorporated by reference herein.
3. Vertical Stirred Ball Mill (VSB-M) a.k.a. Attrition Mill (Union Process Attritor Co., Akron, Ohio). See Szeavari U.S. Pat. No. 4,979,686 which is incorporated by reference herein.

Each mill was used to produce 5×15 microns product with a mean particle size of about 8 microns. Distinctions in the test procedures and unique obstacles encountered are discussed below.

Test products were subjected to laser diffraction size analysis with a Beckman Coulter LS 13 320 Particle Size Analyzer. A "Nepheline Syenite" optical model was used instead of a "Fraunhofer" optical model. In addition, BET surfaces area measurements and Tappi brightness measurements of each product were made. Scanning electron micrographs, SEM, of select products were also taken.

Vibro-Kinetic Ball Mill—The VibroKinetic Ball mill was operated in closed circuit with an air classifier.

Fluid Bed Opposed Flow Jet Mill—Hosokawa-Alpine produced the 5×15 powder by grinding to <15 microns in the Jet Mill and air classifying this product to remove the minus 5 micron material.

VSB-Mill (a.k.a. Attrition Mill)—This mill was used to produce the −15 micron product. The Union Process Attritor Co. had no means to classify −5 micron material from the −15 micron product to make a 5×15 micron product. This was performed by a separate classifier.

TABLE 5

Color and Surface Area Analyses of Ultra-Fine Products

| Sample | Grind | Tappi Brightness | L* | a* | b* | BET Surface Area |
|---|---|---|---|---|---|---|
| 1 | Vibro (−5μ) | 81.50 | 92.240 | −0.182 | 3.874 | NA |
| 2 | Vibro (−15μ) | 78.20 | 91.324 | 0.067 | 4.580 | NA |
| 3 | Jet (−5μ) | 87.80 | 94.312 | −0.066 | 0.452 | 3.5 |
| 4 | Jet (−15μ) | 87.85 | 94.075 | −0.088 | 0.511 | 2.3 |
| 5 | VSB-M (−5μ) | 92.44 | 96.625 | −0.125 | 0.743 | 17.1 |
| 6 | VSB-M (−15μ) | 88.41 | 94.660 | −0.195 | 0.996 | 19.0 |

The research and development project as described above resulted in a new level of know-how establishing that the novel nepheline syenite powder is obtainable by proper selection of manufacturing techniques. The reported initial research and development project resulted in a discovery of the unique process disclosed generally in FIG. 3 and the preferred process disclosed generally in FIGS. 23-27. Selection of preferred methods was a major development in the nepheline syenite art and resulted finally in the ability to produce economically the novel nepheline syenite powder having a controlled maximum grain size D95 of about 15 microns and a controlled minimum grain size of D5 of 4-7 microns, with a very narrow particle size distribution.

Powder filler samples were produced using the method of FIG. 3. A Nissin Engineering, Inc. Model TC-15-NS Turbo Classifier, equipped with a fine rotor for classification in the range of 2-20 microns was used. As is shown in FIG. 3, the classifier also has a microprocessor that provides automatic calculations of operating conditions. The operator enters the desired cut size (in microns) and the density (g/cm$^3$) of the mineral being classified via a touch screen panel. Then, the microprocessor calculates the classifier rotor speed (rpm) and classifier air required (in m$^3$/min). As an example, a 5 microns cut with 2.7-g/cm$^3$ nepheline syenite requires a rotor speed of 8,479 rpm and an airflow rate of 1.2 m$^3$/min). A schematic of the classification process is shown in FIG. 3.

Particle size distribution (PSD) results of the products made with the TC-15-NS Classifier are summarized in Table 7.

TABLE 6

Actual Size Distributions of Targeted Products

| Target Size | Actual Size | | | | | | | | | |
|---|---|---|---|---|---|---|---|---|---|---|
| | $D_{99.9}$ | $D_{99}$ | $D_{95}$ | $D_{90}$ | $D_{75}$ | $D_{50}$ | $D_{25}$ | $D_{10}$ | $D_5$ | $D_1$ |
| 4 × 15 | 17.1 | 15.7 | 14.2 | 13.2 | 11.2 | 8.82 | 6.99 | 5.78 | 5.16 | 2.33 |
| 5 × 15 | 17.1 | 16.1 | 14.6 | 13.7 | 11.7 | 9.41 | 7.46 | 6.20 | 5.57 | 4.68 |
| 6 × 15 | 18.6 | 17.9 | 16.1 | 14.8 | 12.4 | 10.1 | 8.02 | 6.46 | 5.72 | 4.47 |

The air classifier did a reasonably good job at making the target cuts. One important discovery was that the starting material greatly impacts success.

The Nissin Engineering Model TC-15-NS of FIG. 3 is an excellent laboratory and small-scale pilot classifier. It is precise, accurate, and relatively easy to operate. However, the method described in FIG. 21 has been discovered to be suited for production runs.

Summary Observations

Individual steps or operations in the several methods can be combined and modified to produce the novel ultra-fine nepheline syenite powder. These combinations are novel and inventive. It is not intended that the disclosed embodiments of the method or the specific samples of novel nepheline syenite powder are to be limited to the actual examples or samples; but, the invention as described includes such modifications and alternatives as would occur to a person upon reading and understanding this detailed description of the several inventions.

It is claimed:

1. A method of producing an ultra-fine powder, said powder having a targeted maximum particle size D95 and a targeted minimum particle size D5 with a particle size distribution of D5 to D95 of less than 12 microns, said method comprises:
   (a) providing a ground feedstock formed from a naturally occurring mineral or rock material having a reflective index of about 1.4 to 1.6;
   (b) grinding said feedstock in a mill;
   (c) classifying said mill ground feedstock with a first classifier to produce an intermediate powder, said intermediate powder having a targeted D95 maximum particle size with a value, which value is in the range of 14-17 microns;
   (d) classifying said intermediate powder through a second classifier to remove all particles less than a targeted particle size with a value, which value is in the range of 4-7 microns to produce said ultra-fine powder having a targeted D5 minimum particle size with a selected value in the range 4-7 microns.

2. The method as defined in claim 1 wherein said feedstock is a material selected from the class comprising silica (including ground natural and diatomaceous), cristobalite, feldspar, quartz, nepheline syenite, kaolin, talc, attapulgite, pyrophylite and tridymite.

3. The method as defined in claim 1 wherein said targeted maximum particle size D95 of said ultra-fine powder is 15 microns.

4. The method as defined in claim 3 wherein said targeted minimum particle size D5 of said ultra-fine powder is 5 microns.

5. The method as defined in claim 4 wherein said feedstock is a material selected from the class comprising nepheline syenite, feldspar, silica, quartz, cristobalite and tidymite.

6. The method as defined in claim 1 wherein said first classifier is in said mill.

7. A method of producing an ultra-fine powder, said powder having a targeted maximum particle size D95 and a targeted minimum particle size D5 with a particle size distribution of D5 to D95 less than 12 microns, said method comprises:
   (a) providing a ground feedstock formed from a naturally occurring mineral or rock material having a Mohs hardness of at least 5;
   (b) grinding said feedstock in a mill;
   (c) classifying said mill ground feedstock with a first classifier to produce an intermediate powder, said intermediate powder having a targeted D95 maximum particle size with a value, which value is in the range of 14-17 microns;
   (d) classifying said intermediate powder through a second classifier to remove all particles less than a targeted particle size with a value, which value is in the range of 4-7 microns to produce said ultra-fine powder having a targeted D5 minimum particle size with a selected value in the range 4-7 microns.

8. The method as defined in claim 7 wherein said targeted maximum particle size D95 of said ultra-fine powder is 15 microns.

9. The method as defined in claim 8 wherein said targeted minimum particle size D5 of said ultra-fine powder is 5 microns.

10. The method as defined in claim 7 wherein said targeted minimum particle size D5 of said ultra-fine powder is 5 microns.

11. The method as defined in claim 7 wherein said first classifier is in said mill.

* * * * *